(12) United States Patent
Li et al.

(10) Patent No.: US 11,790,812 B2
(45) Date of Patent: Oct. 17, 2023

(54) MULTI-SCREEN DISPLAY INSTALLATION DEVICE, INSTALLATION METHOD AND MULTI-SCREEN FRAME

(71) Applicant: Top Victory Investments Limited, Hong Kong (HK)

(72) Inventors: Quan Bo Li, Hong Kong (HK); Li-Wei Lin, Yilan (TW); Kuo-Hua Liao, Taipei (TW)

(73) Assignee: TOP VICTORY INVESTMENTS LIMITED, Hong Kong (HK)

( * ) Notice: Subject to any disclaimer, the term of this patent is extended or adjusted under 35 U.S.C. 154(b) by 342 days.

(21) Appl. No.: 17/158,919

(22) Filed: Jan. 26, 2021

(65) Prior Publication Data
US 2022/0122491 A1   Apr. 21, 2022

(30) Foreign Application Priority Data
Oct. 15, 2020   (TW) .................................. 109135619

(51) Int. Cl.
*G09F 9/302* (2006.01)
*G02F 1/1333* (2006.01)
*F16M 11/04* (2006.01)
*A47F 1/00* (2006.01)
*A47F 1/12* (2006.01)

(52) U.S. Cl.
CPC ........ *G09F 9/3026* (2013.01); *G02F 1/13336* (2013.01); *A47F 1/00* (2013.01); *A47F 1/12* (2013.01); *F16M 11/041* (2013.01)

(58) Field of Classification Search
CPC .................................................... G02F 1/1333
See application file for complete search history.

(56) References Cited

U.S. PATENT DOCUMENTS

| 2012/0113353 A1* | 5/2012 | Kuromizu ............ G09G 3/3426 349/61 |
| 2016/0216734 A1* | 7/2016 | Lin ....................... G06F 1/1632 |

FOREIGN PATENT DOCUMENTS

| CN | 102472446 A |   | 5/2012 |  |
| CN | 205979023   | * | 2/2017 | ............. F16M 11/04 |
| CN | 205979023 U |   | 2/2017 |  |

OTHER PUBLICATIONS

Search Report appended to an Office Action, which was issued to Taiwanese counterpart application No. 109135619 by the TIPO dated Mar. 31, 2021, with an English translation thereof (2 pages).

* cited by examiner

*Primary Examiner* — Sang V Nguyen
(74) *Attorney, Agent, or Firm* — Hamre, Schumann, Mueller & Larson, P.C.

(57) ABSTRACT

A multi-screen display installation device includes a first display cabinet and a second display cabinet with different lengths. Each of the first display cabinet includes first lower and upper connecting portions. The second display cabinet includes second lower and upper connecting portions. Each second lower connecting portion is aligned with and detachably engaged with the corresponding first upper connecting portion to bring the second display cabinet into ready stacking on a top of the first display cabinet in a desired upper stacking position. Each second upper connecting portion is aligned with and detachably engaged with the corresponding first lower connecting portion to bring the second display cabinet into ready stacking on a bottom of the first display cabinet in a desired lower stacking position.

16 Claims, 27 Drawing Sheets

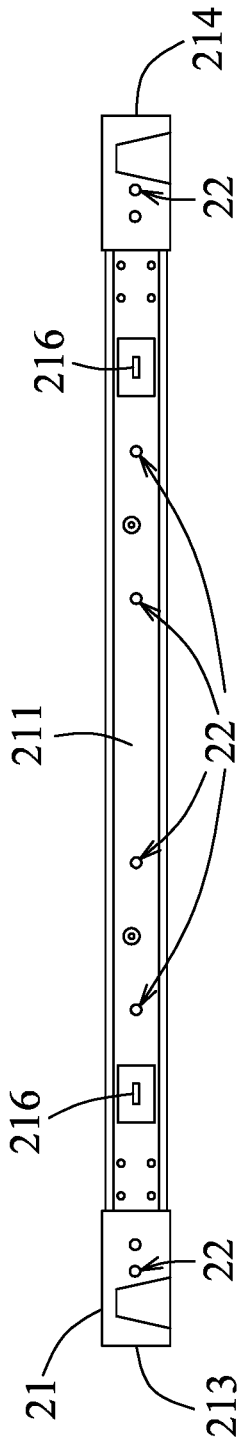
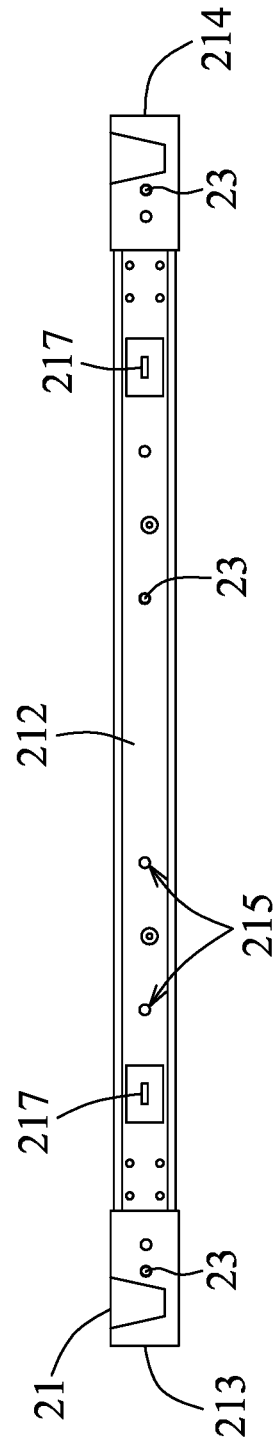

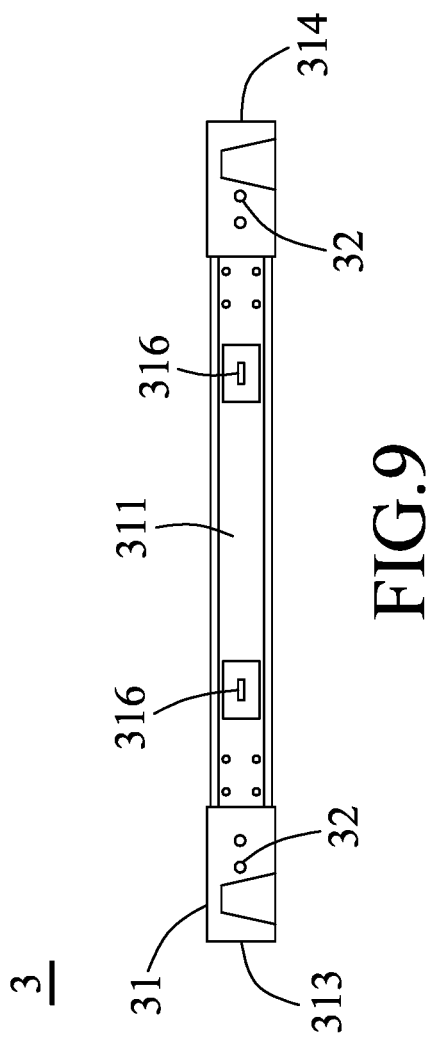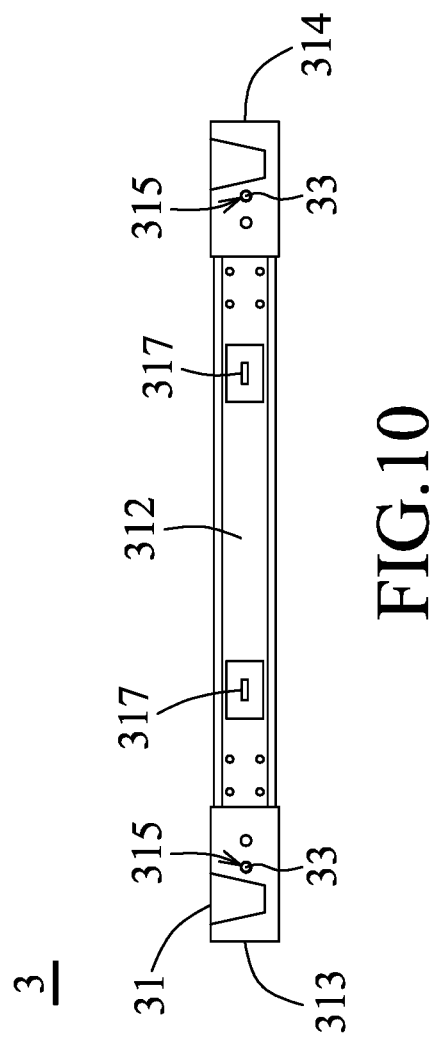

MULTI-SCREEN DISPLAY INSTALLATION DEVICE, INSTALLATION METHOD AND MULTI-SCREEN FRAME

CROSS-REFERENCE TO RELATED APPLICATION

This application claims priority of Taiwanese Patent Application No. 109135619, filed on Oct. 15, 2020.

FIELD

The disclosure relates to an installation device, and more particularly to a multi-screen display installation device, an installation method and a multi-screen frame.

BACKGROUND

In order to install two conventional LED display cabinets with the same shape but different dimensions to constitute a large screen, the display cabinets are arranged vertically or horizontally and are positioned to each other through a plurality of back connecting plates abutting against back surfaces of the display cabinets and a plurality of screw fasteners securing the back connecting plates to the back surfaces of the display cabinets. However, since the screw fasteners are used to secure the back surfaces of the display cabinets, undesired deformation of the cabinets might occur due to a large screwing force, and hence misalignment of the cabinets might occur to form a large gap between them. Assembly, disassembly and adjusting operations of the installation device are troublesome and time consuming.

SUMMARY

Therefore, an object of the disclosure is to provide a multi-screen display installation device that can alleviate at least one of the drawbacks of the prior art.

According to the disclosure, the multi-screen display installation device includes a first display cabinet and a second display cabinet. The first display cabinet defines a first length in a lengthwise direction. The first display cabinet includes a plurality of first lower connecting portions spaced apart from each other in the lengthwise direction, and a plurality of first upper connecting portions spaced apart from each other in the lengthwise direction. The second display cabinet defines a second length in the lengthwise direction and smaller than the first length. The second display cabinet includes a plurality of second lower connecting portions spaced apart from each other in the lengthwise direction, and a plurality of second upper connecting portions spaced apart from each other in the lengthwise direction. Each of the second lower connecting portions is aligned with and detachably engaged with a respective one of the first upper connecting portions in a height direction that is transverse to the lengthwise direction to bring the second display cabinet into stacking on a top of the first display cabinet in a selected one of upper stacking positions that are different from each other in the lengthwise direction so as to position the second display cabinet to the first display cabinet. Each of the second upper connecting portions is aligned with and detachably engaged with a respective one of the first lower connecting portions in the height direction to bring the second display cabinet into stacking on a bottom of the first display cabinet in a selected one of lower stacking positions that are different from each other in the lengthwise direction so as to position the second display cabinet to the first display cabinet.

Another object of the disclosure is to provide a multi-screen frame that can alleviate at least one of the drawbacks of the prior art.

According to the disclosure, the multi-screen frame includes at least two structural units stacked on each other in a height direction. Each of the structural units has at least one display cabinet. The display cabinets of the structural units respectively define lengths which are taken in a lengthwise direction that is transverse to the height direction and which are different from each other.

Still another object of the disclosure is to provide an installation method that can alleviate at least one of the drawbacks of the prior art.

According to the disclosure, the installation method includes steps of: providing a plurality of first display cabinets, a plurality of second display cabinets and a plurality of third display cabinets, each of the first display cabinets defining a first length in a lengthwise direction, each of the second display cabinets defining a second length in the lengthwise direction, the second length being smaller than the first length, each of the third display cabinets defining a third length in the lengthwise direction, the third length being smaller than the second length; setting an installation size, the installation size having an installation height in a height direction that is transverse to the lengthwise direction, and an installation length in the lengthwise direction; selecting at least two display cabinets from the first, second and third display cabinets with different lengths; and adjoining the selected display cabinets with each other to form a multi-screen frame that meets the installation height and the installation length, the multi-screen frame having at least two structural units stacked on each other in the height direction, the at least two structural units being composed of the at least two display cabinets with different lengths, respectively.

BRIEF DESCRIPTION OF THE DRAWINGS

Other features and advantages of the disclosure will become apparent in the following detailed description of the embodiments with reference to the accompanying drawings, of which:

FIG. 7 is a bottom view illustrating the second display cabinet of the embodiment;

FIG. 8 is a top view illustrating the second display cabinet of the embodiment;

FIG. 9 is a bottom view illustrating the third display cabinet of the embodiment;

FIG. 10 is a top view illustrating the third display cabinet of the embodiment;

DETAILED DESCRIPTION

Figure 1:
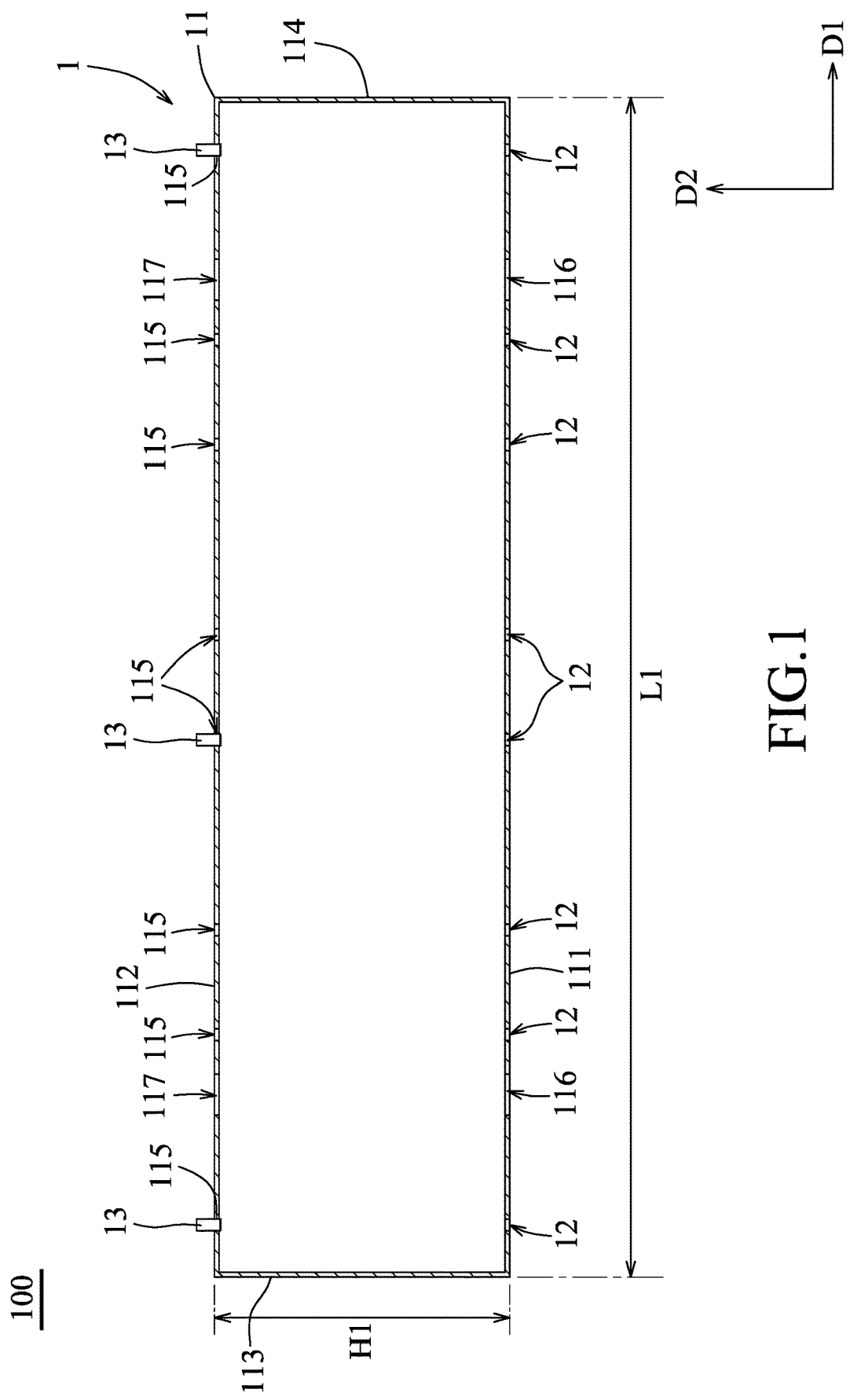
FIG. 1 is a sectional view illustrating a first display cabinet of an embodiment of a multi-screen display installation device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
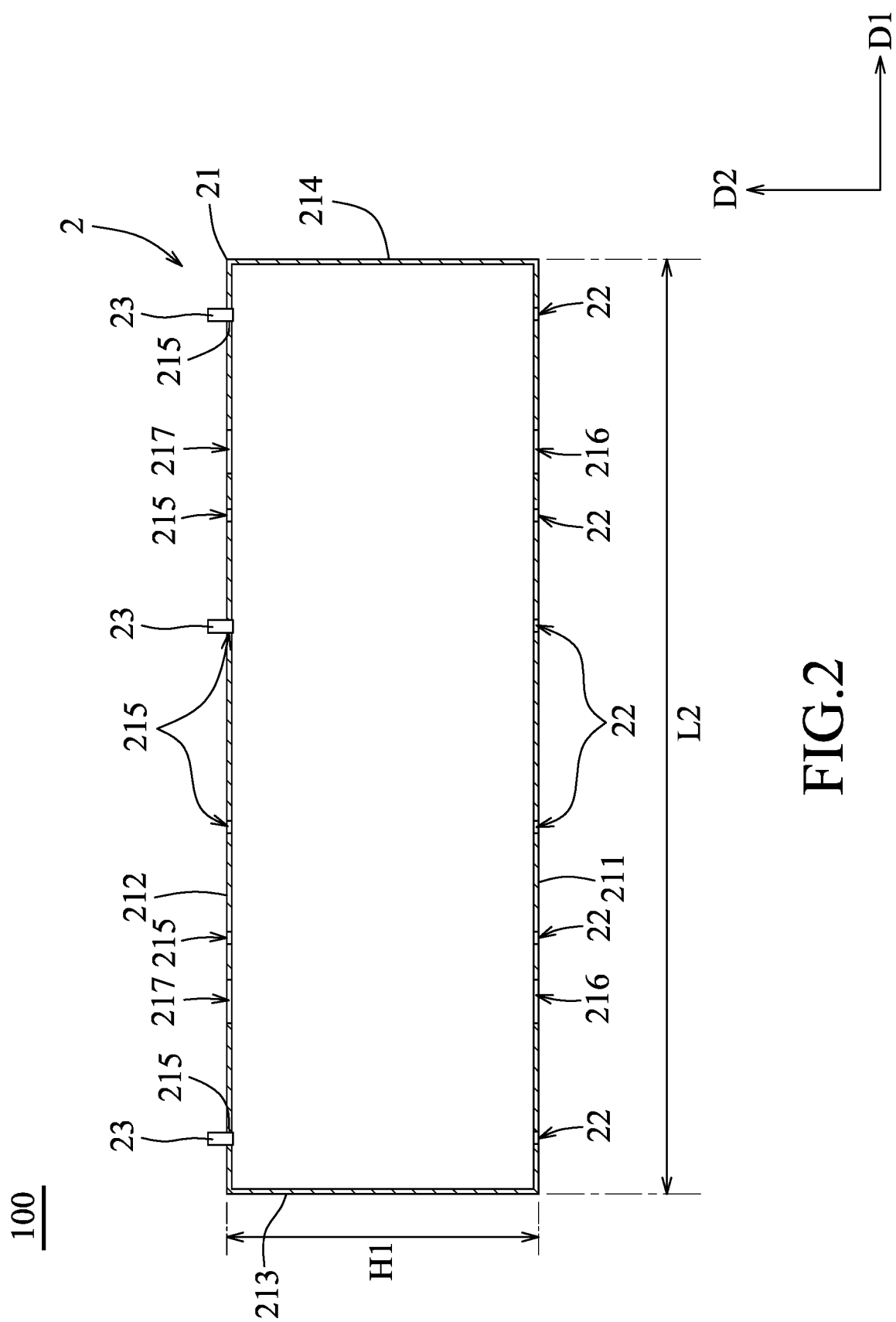
FIG. 2 is a sectional view illustrating a second display cabinet of the embodiment.
Figure 3:
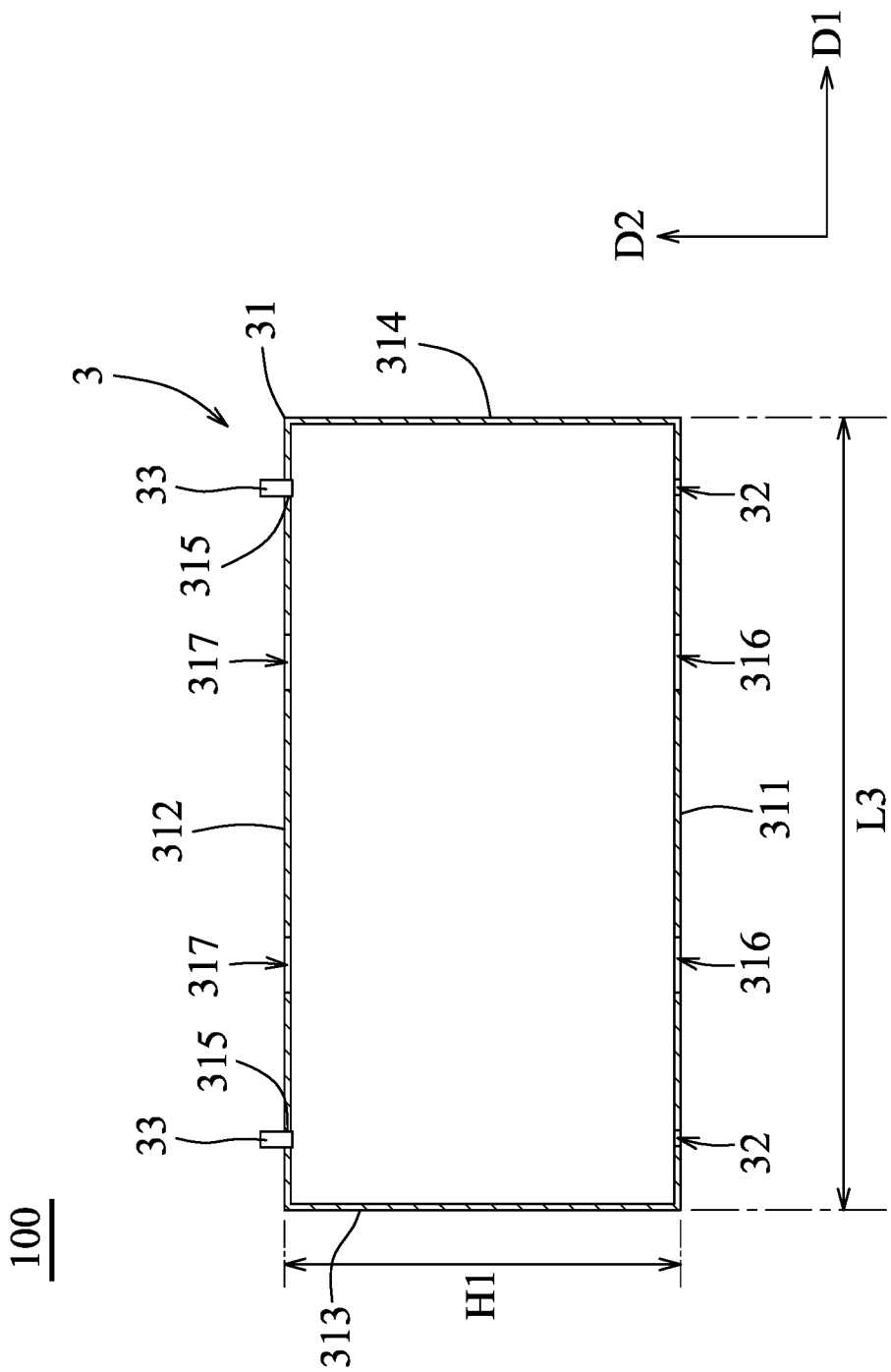
FIG. 3 is a sectional view illustrating a third display cabinet of the embodiment.
Figure 4:
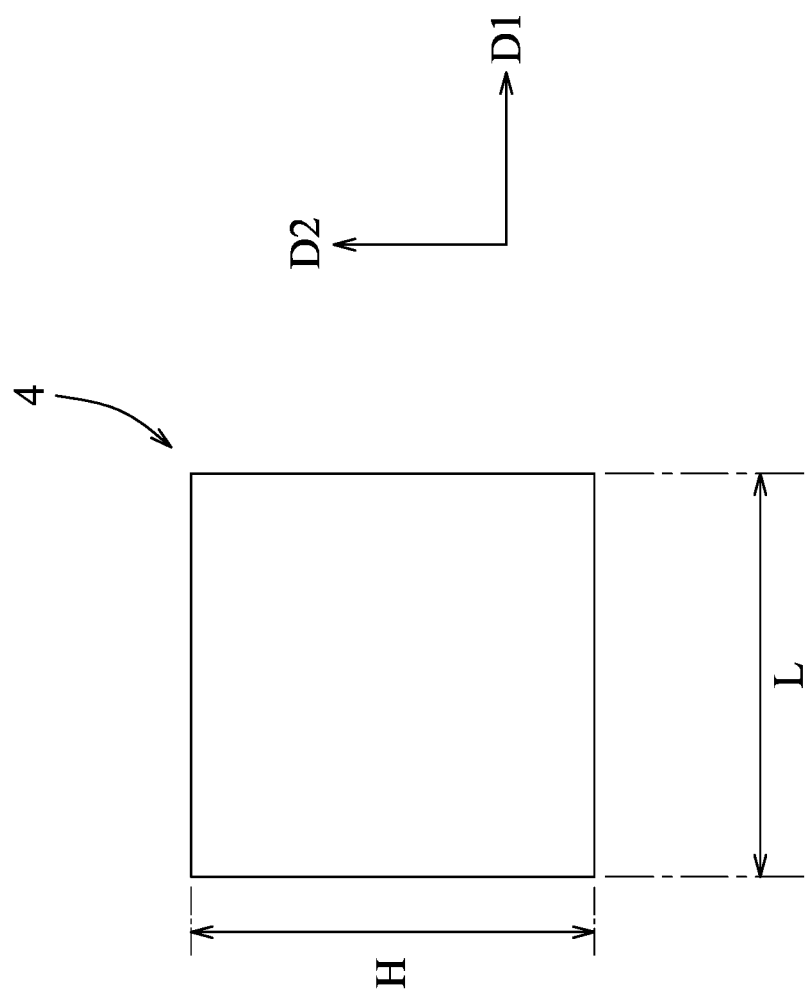
FIG. 4 is a front view illustrating a display module loaded on the embodiment.
Figure 5:
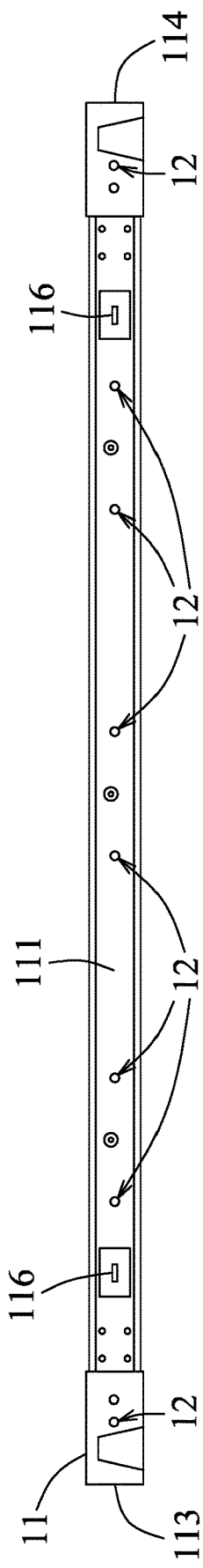
FIG. 5 is a bottom view illustrating the first display cabinet of the embodiment.
Figure 6:
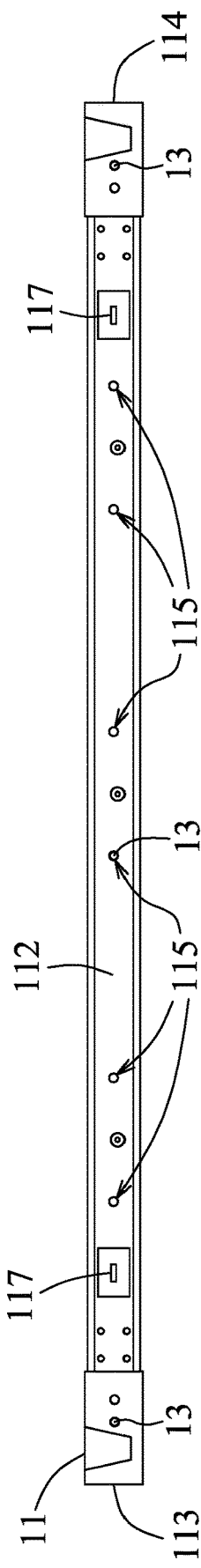
FIG. 6 is a top view illustrating the first display cabinet of the embodiment.

Referring to FIGS. 1 to 4, an embodiment of a multi-screen display installation device 100 according to the disclosure includes a plurality of first display cabinets 1 (only one is shown in FIG. 1), a plurality of second display cabinets 2 (only one is shown in FIG. 2), and a plurality of third display cabinets 3 (only one is shown in FIG. 3). Each of the first, second and third display cabinets 1, 2, 3 is adapted to carry a plurality of display modules 4 (only one is shown in FIG. 4).

Each of the display modules 4 is in the form of an LED display module in this embodiment, and alternatively may be a LCD display module, a plasma display module, or the like. Each display module 4 is of a square shape, and has a module length (L) in a lengthwise direction (D1), and a module height (H) in a height direction (D2). For example, the module length (L) and the module height (H) are the same and about 250 mm.

With reference to FIGS. 1, 4, 5 and 6, each first display cabinet 1 has a front side for carrying the corresponding display module 4. Each first display cabinet 1 includes a first cabinet frame 11 which has a first bottom wall 111 extending in the lengthwise direction (D1), a first top wall 112 extending in the lengthwise direction (D1) and opposite to the first bottom wall 111 in the height direction (D2), a left side 113 extending in the height direction (D2), and a right side 114 extending in the height direction (D2) and opposite to the left side 113 in the lengthwise direction (D1). The first cabinet frame 11 defines a first length (L1) in the lengthwise direction (D1), and a height (H1) in the height direction (D2). For example, the first length (L1) is four times the module length (L), and is about 1000 mm. The height (H1) is the same as the module height (H).

Each first display cabinet 1 includes a plurality of first lower connecting portions 12 disposed to the first bottom wall 111 and spaced apart from each other in the lengthwise direction (D1), and a plurality of first upper connecting portions 13 disposed to the first top wall 112 and spaced apart from each other in the lengthwise direction (D1). In this embodiment, eight first lower connecting portions 12 are disposed in the first bottom wall 111, and each of the first lower connecting portions 12 is in the form of a positioning hole formed in the first bottom wall 111 and extending through the first bottom wall 111 in the height direction (D2). The first top wall 112 has a plurality of first threaded holes 115 which are spaced apart from each other in the lengthwise direction (D1). For example, eight first threaded holes 115 are formed and aligned with the first lower connecting portions 12, respectively. The number of the first upper connecting portions 13 is less than that of the first threaded holes 115. For example, three first upper connecting portions 13 are disposed, and each of the first upper connecting portions 13 is in the form of a threaded bolt which is threadedly engaged in the corresponding first threaded hole 115 and which extends in the height direction (D2). By means of the first upper connecting portion 13 detachably engaged in the selected first threaded hole 115, the first upper connecting portions 13 are adjustably disposed to the first top wall 112 along the lengthwise direction (D1).

The first bottom wall 111 has two first lower splits 116 spaced apart from each other in the lengthwise direction (D1). The first top wall 112 has two first upper splits 117 spaced apart from each other in the lengthwise direction (D1) and aligned with the first lower splits 116, respectively. The first lower and upper splits 116, 117 may be enlarged by using a hand tool, such as a screw driver, which may be inserted and rotated therein to form a wiring hole for running of a signal wire and a power wire therethrough.

With reference to FIGS. 2, 4, 7 and 8, each second display cabinet 2 has a front side for carrying the corresponding display module 4. Each second display cabinet 2 includes a second cabinet frame 21 which has a second bottom wall 211 extending in the lengthwise direction (D1), a second top wall 212 extending in the lengthwise direction (D1) and opposite to the second bottom wall 211 in the height direction (D2), a left side 213 extending in the height direction (D2), and a right side 214 extending in the height direction (D2) and opposite to the left side 213 in the lengthwise direction (D1). The second cabinet frame 21 defines a second length (L2) in the lengthwise direction (D1), and the height (H1) in the height direction (D2). The second length (L2) is smaller than the first length (L1). For example, the second length (L2) is three times the module length (L), and is about 750 mm.

Each second display cabinet 2 includes a plurality of second lower connecting portions 22 disposed to the second bottom wall 211 and spaced apart from each other in the lengthwise direction (D1), and a plurality of second upper connecting portions 23 disposed to the second top wall 212 and spaced apart from each other in the lengthwise direction (D1). In this embodiment, six second lower connecting portions 22 are disposed, and each of the second lower connecting portions 22 is in the form of a positioning hole formed in the second bottom wall 211 and extending through the second bottom wall 211 in the height direction (D2). The second top wall 212 has a plurality of second threaded holes 215 which are spaced apart from each other in the lengthwise direction (D1). For example, six second threaded holes 215 are formed and aligned with the second lower connecting portions 22, respectively. The number of the second upper connecting portions 23 is less than that of the second threaded holes 215. For example, three second upper connecting portions 23 are disposed, and each of the second upper connecting portions 23 is in the form of a threaded bolt which is threadedly engaged in the corresponding second threaded hole 215 and which extends in the height direction (D2). By means of the second upper connecting portion 23 detachably engaged in the selected second threaded hole 215, the second upper connecting portions 23 are adjustably disposed to the second top wall 212 along the lengthwise direction (D1).

The second bottom wall 211 has two second lower splits 216 spaced apart from each other in the lengthwise direction (D1). The second top wall 212 has two second upper splits 217 spaced apart from each other in the lengthwise direction (D1) and aligned with the second lower splits 216, respectively. The second lower and upper splits 216, 217 may be enlarged by using a hand tool, such as a screw driver, which may be inserted and rotated therein to form a wiring hole for running of a signal wire and a power wire therethrough.

With reference to FIGS. 3, 4, 9 and 10, each third display cabinet 2 has a front side for carrying the corresponding display module 4. Each third display cabinet 3 includes a third cabinet frame 31 which has a third bottom wall 311 extending in the lengthwise direction (D1), a third top wall 312 extending in the lengthwise direction (D1) and opposite to the third bottom wall 311 in the height direction (D2), a left side 313 extending in the height direction (D2), and a right side 314 extending in the height direction (D2) and opposite to the left side 313 in the lengthwise direction (D1). The third cabinet frame 31 defines a third length (L3) in the lengthwise direction, and the height (H1) in the height direction (D2). The third length (L3) is smaller than the second length (L2) (see FIG. 2). For example, the third length (L3) is two times the module length (L), and is about 500 mm. The second length (L2) is 0.75 times the first length (L1). The first length (L1) (see FIG. 1) is two times the third length (L3). The second length (L2) is 1.5 times the third length (L3).

Each third display cabinet 3 includes a plurality of third lower connecting portions 32 disposed to the third bottom wall 311 and spaced apart from each other in the lengthwise direction (D1), and a plurality of third upper connecting portions 33 disposed to the third top wall 312 and spaced apart from each other in the lengthwise direction (D1). In this embodiment, two third lower connecting portions 32 are disposed, and each of the third lower connecting portions 32 is in the form of a positioning hole formed in the third bottom wall 311 and extending through the third bottom wall 311 in the height direction (D2). The third top wall 312 has a plurality of third threaded holes 315 which are spaced apart from each other in the lengthwise direction (D1). For example, two third threaded holes 315 are formed and aligned with the third lower connecting portions 32, respectively. The number of the third upper connecting portions 33 is two, and each third upper connecting portion 33 is in the form of a threaded bolt which is threadedly engaged in the corresponding third threaded hole 315 and which extends in the height direction (D2).

The third bottom wall 311 has two third lower splits 316 spaced apart from each other in the lengthwise direction (D1). The third top wall 312 has two third upper splits 317 spaced apart from each other in the lengthwise direction (D1) and aligned with the third lower splits 316, respectively. The third lower and upper splits 316, 317 may be enlarged by using a hand tool, such as a screw driver, which may be inserted and rotated therein to form a wiring hole for running of a signal wire and a power wire therethrough.

Figure 11:
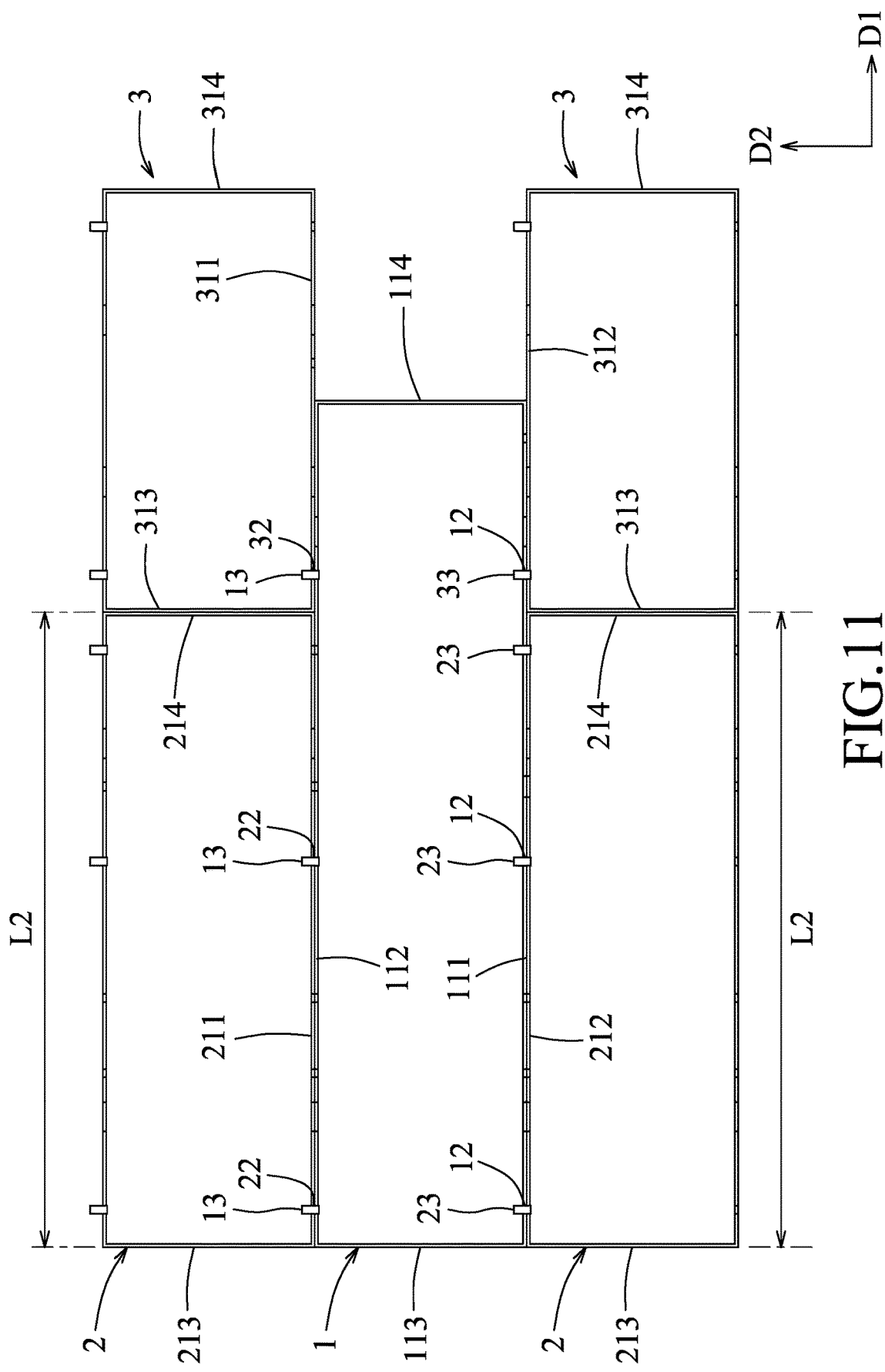
FIGS. 11 to 22 are schematic views illustrating the embodiment in a variety of stacked states, respectively.

Referring to FIG. 11, the second bottom wall 211 of each second display cabinet 2 is stackable on the first top wall 112 of a selected one of the first display cabinet 1 to bring the second display cabinet 2 into stacking on a top of the first display cabinet 1 in a selected one of upper stacking positions that are different from each other in the lengthwise direction (D1). Each of the second lower connecting portions 22 is aligned with and detachably engaged with a corresponding one of the first upper connecting portions 13 in the height direction (D2) so as to position the second display cabinet 2 to the first display cabinet 1. The upper stacking positions are a first upper stacking position (see FIG. 11), a second upper stacking position (see FIG. 12), a third upper stacking position (see FIG. 13), a fourth upper stacking position (see FIG. 14), a fifth upper stacking position (see FIG. 15) and a sixth upper stacking position (see FIG. 16). The second top wall 212 of each second display cabinet 2 is stackable on the first bottom wall 111 of a selected one of the first display cabinet 1 to bring the second display cabinet 2 into stacking on a bottom of the first display cabinet 1 in a selected one of lower stacking positions that are different from each other in the lengthwise direction (D1). Each of the second upper connecting portions 23 is aligned with and detachably engaged with a respective one of the first lower connecting portions 12 in the height direction (D2) so as to position the second display cabinet 2 to the first display cabinet 1. The lower stacking positions are a first lower stacking position (see FIG. 11), a second lower stacking position (see FIG. 12), a third lower stacking position (see FIG. 13), a fourth lower stacking position (see FIG. 14), a fifth lower stacking position (see FIG. 15) and a sixth lower stacking position (see FIG. 16).

Specifically, in the first upper stacking position or the first lower stacking position, the left side 213 of the second display cabinet 2 is vertically aligned with the left side 113 of the first display cabinet 1 while the right side 214 is distanced from the right side 114. In the first upper stacking position, two of the first upper connecting portions 13 of the first display cabinet 1 are respectively engaged with the corresponding ones of the second lower connecting portions 22 of the second display cabinet 2. In the first lower stacking position, three of the second upper connecting portions 23 of the second display cabinet 2 are respectively engaged with the corresponding ones of the first lower connecting portions 12 of the first display cabinet 1.

Figure 12:
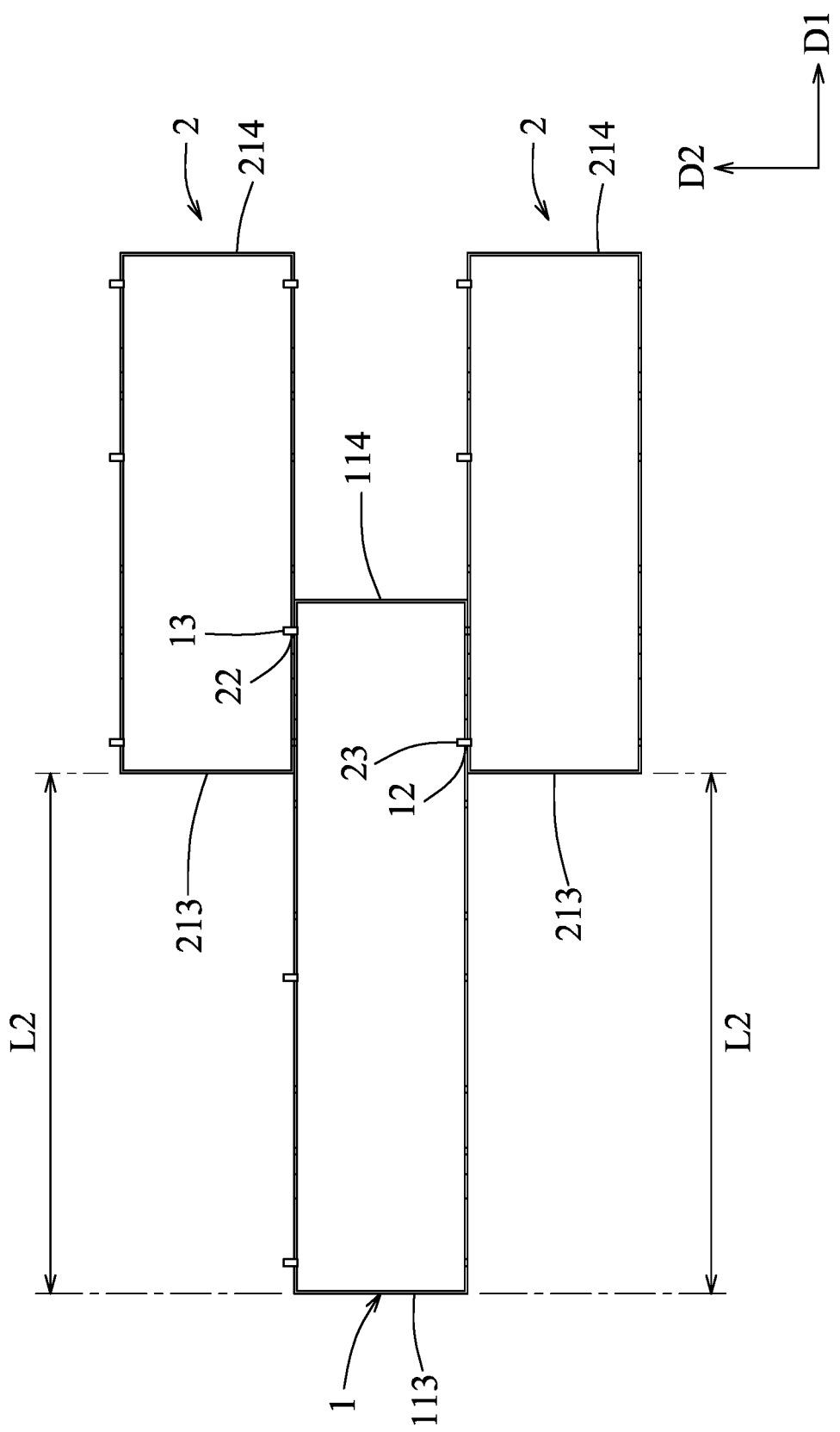

Referring to FIG. 12, in the second upper stacking position or the second lower stacking position, the left side 213 of the second display cabinet 2 is distanced from the left side 113 of the first display cabinet 1 in the lengthwise direction (D1) while the right side 214 projects laterally from the right side 114. In the second upper stacking position, one of the first upper connecting portions 13 of the first display cabinet 1 is engaged with the corresponding second lower connecting portion 22. In the second lower stacking position, one of the second upper connecting portions 23 is engaged with the corresponding first lower connecting portion 12 of the first display cabinet 1.

Figure 13:
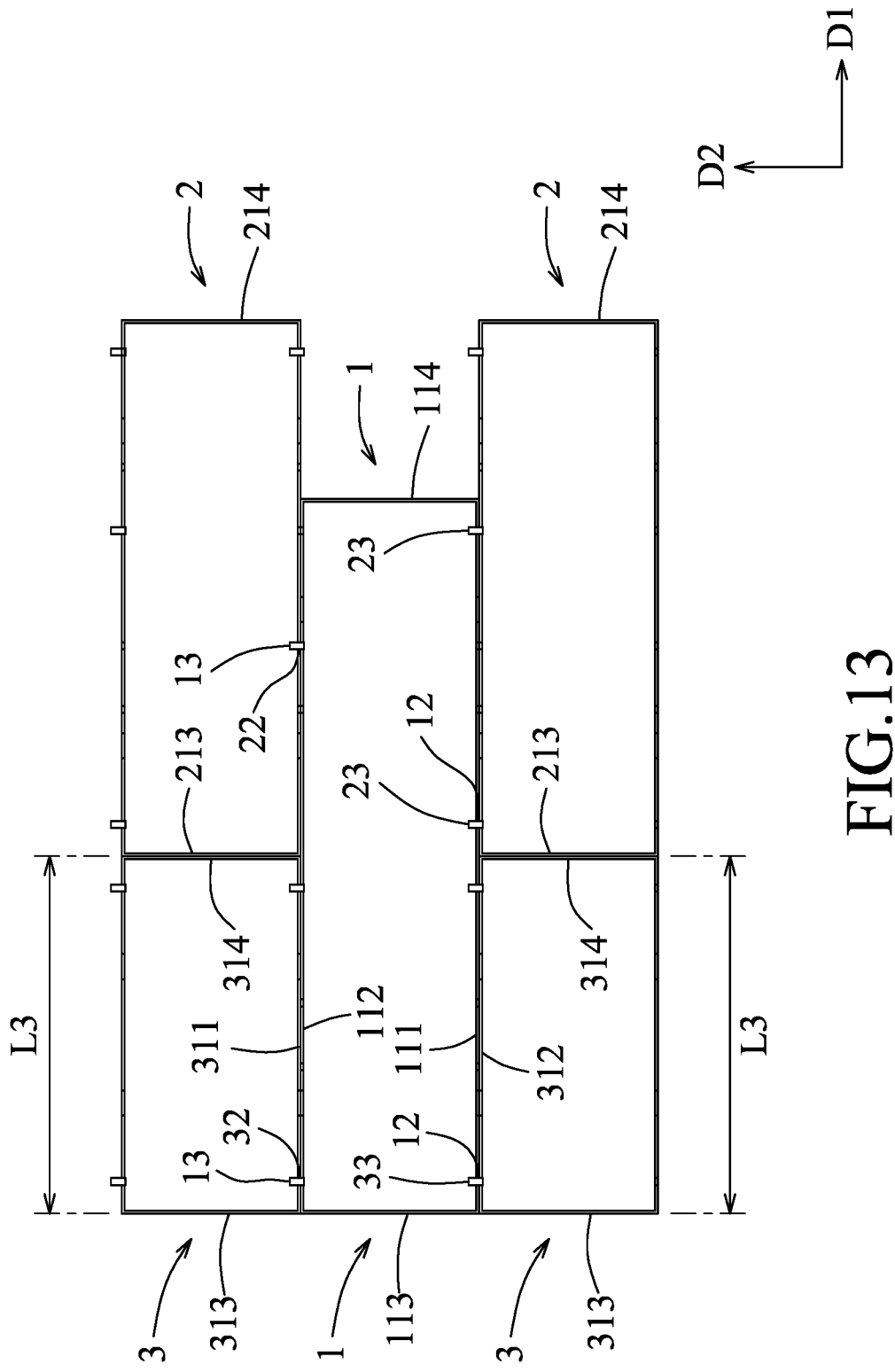

Referring to FIG. 13, in the third upper stacking position or the third lower stacking position, the left side 213 of the second display cabinet 2 is distanced from the left side 113 of the first display cabinet 1 in the lengthwise direction (D1) while the right side 214 is distanced from the right side 114. In the third upper stacking position, one of the first upper connecting portions 13 of the first display cabinet 1 is engaged with the corresponding second lower connecting portion 22. In the third lower stacking position, two of the second upper connecting portions 23 are respectively engaged with the corresponding ones of the first lower connecting portions 12.

Figure 14:
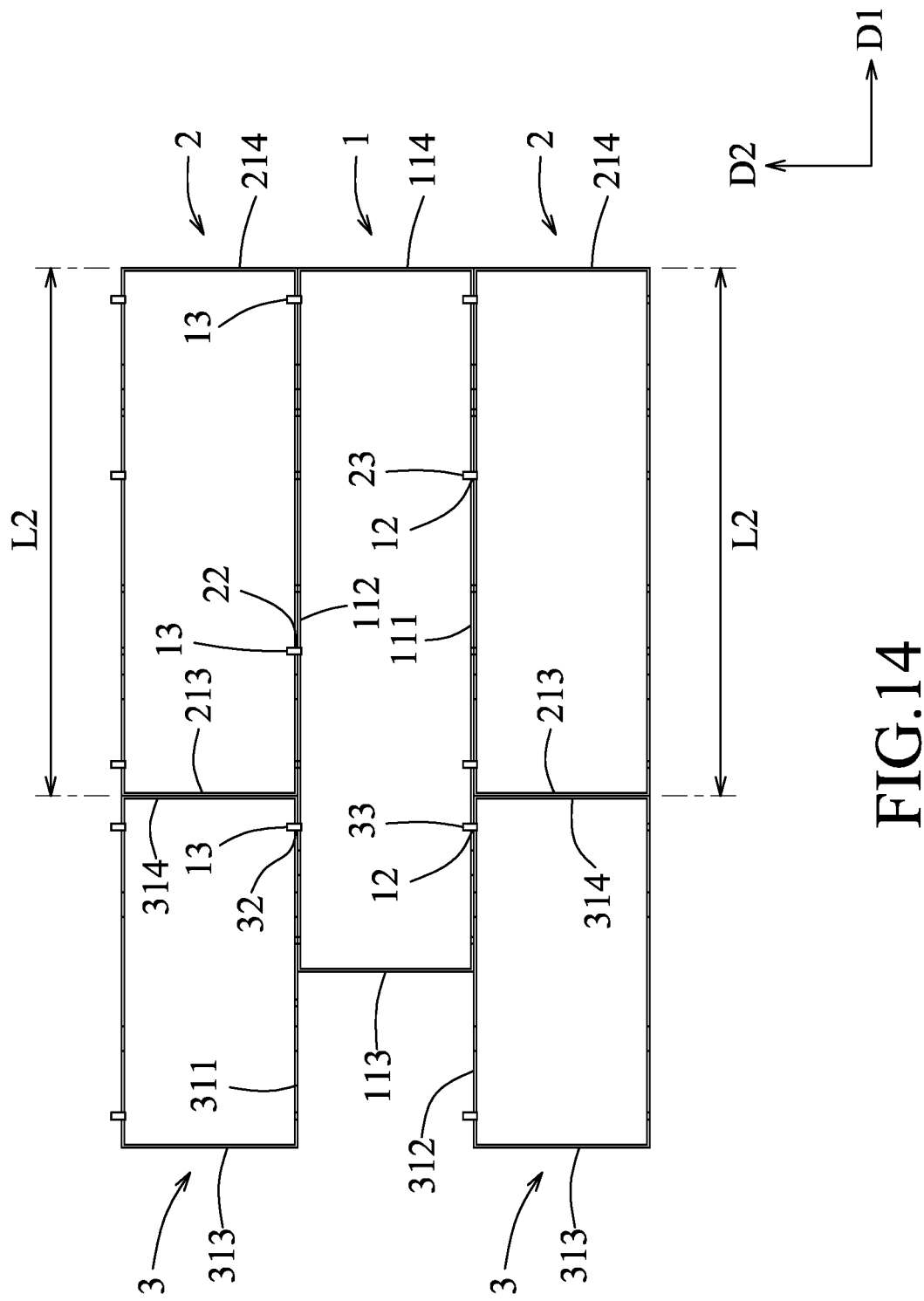

Referring to FIG. 14, in the fourth upper stacking position or the fourth lower stacking position, the right side 214 of the second display cabinet 2 is vertically aligned with the right side 114 of the first display cabinet 1 while the left side 213 is distanced from the left side 113. In the fourth upper stacking position, two of the first upper connecting portions 13 of the first display cabinet 1 are respectively engaged with the corresponding ones of the second lower connecting portions 22 of the second display cabinet 2. In the fourth lower stacking position, three of the second upper connecting portions 23 of the second display cabinet 2 are respectively engaged with the corresponding ones of the first lower connecting portions 12.

Figure 15:
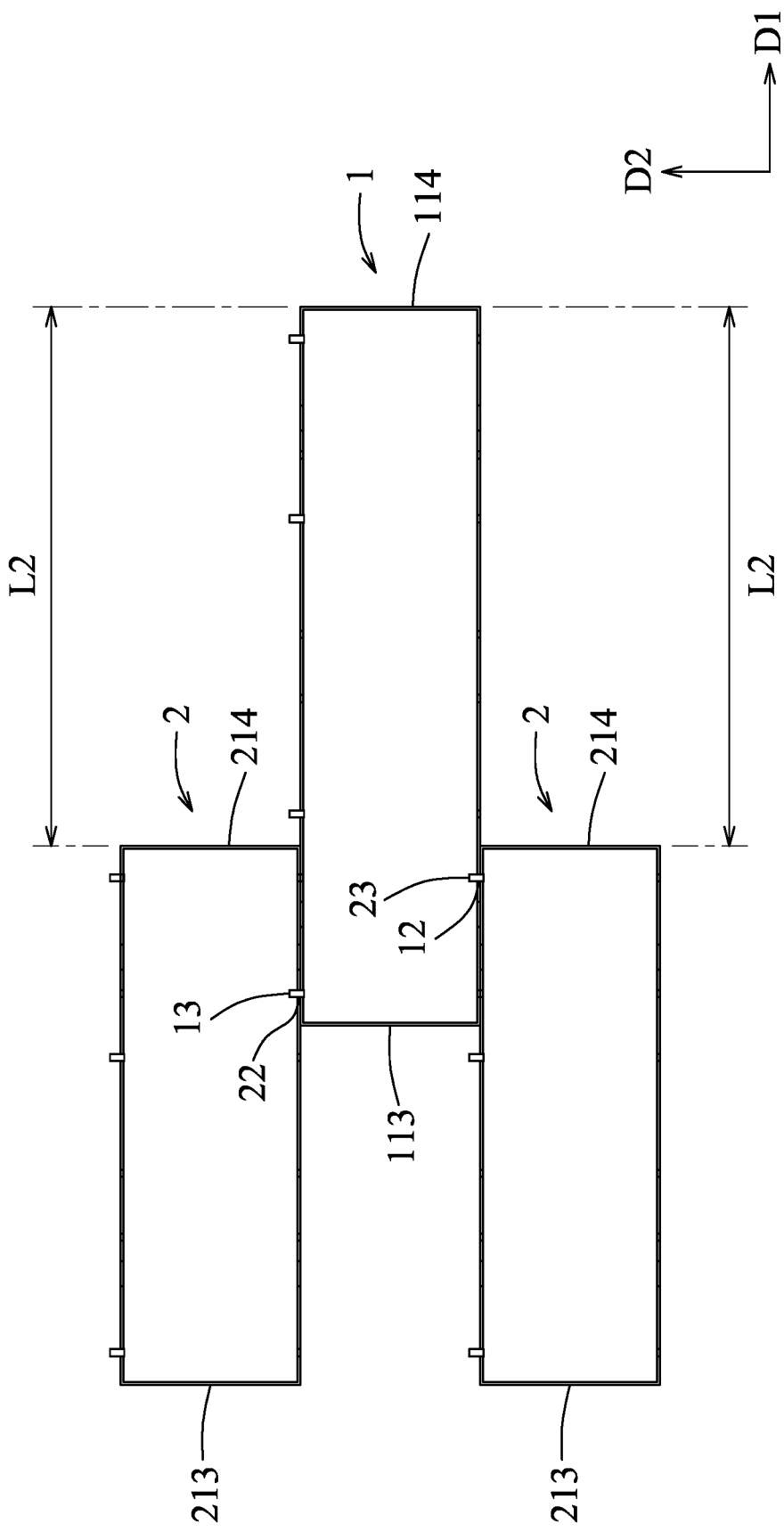

Referring to FIG. 15, in the fifth upper stacking position or the fifth lower stacking position, the right side 214 of the second display cabinet 2 is distanced from the right side 114 of the first display cabinet 1 in the lengthwise direction (D1)

while the left side 213 projects laterally from the left side 113. In the fifth upper stacking position, one of the first upper connecting portions 13 of the first display cabinet 1 is engaged with the corresponding second lower connecting portion 22 of the second display cabinet 2. In the fifth lower stacking position, one of the second upper connecting portions 23 of the second display cabinet 2 is engaged with the corresponding first lower connecting portion 12.

Figure 16:
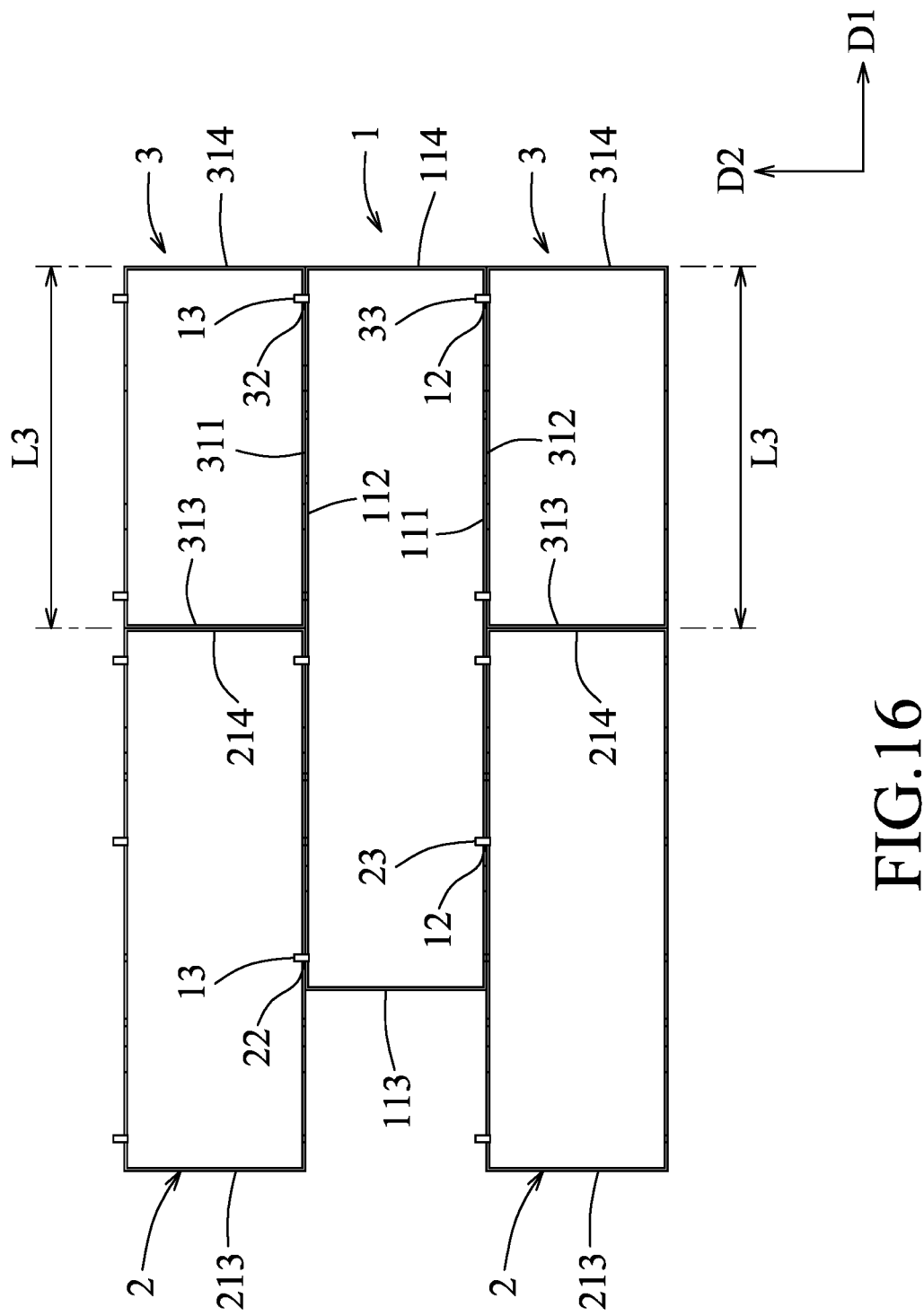

Referring to FIG. 16, in the sixth upper stacking position or the sixth lower stacking position, the right side 214 of the second display cabinet 2 is distanced from the right side 114 of the first display cabinet 1 in the lengthwise direction (D1) while the left side 213 projects laterally from the left side 113. In the sixth upper stacking position, two of the first upper connecting portions 13 of the first display cabinet 1 are respectively engaged with the corresponding second lower connecting portions 22 of the second display cabinet 2. In the sixth lower stacking position, two of the second upper connecting portions 23 of the second display cabinet 2 are respectively engaged with the corresponding first lower connecting portions 12.

Also, referring to FIG. 11, the first bottom wall 111 of each first display cabinet 1 is stackable on the second top wall 212 of the second display cabinet 2 to be placed in a selected one of upper placing positions that are different from each other in the lengthwise direction (D1), and is positioned to the second display cabinet 2 by alignment and engagement of at least one of the first lower connecting portions 12 with a corresponding one of the second upper connecting portions 23 in the height direction (D2). The upper placing positions are a first upper placing position (see FIG. 11), a second upper placing position (see FIG. 17), a third upper placing position (see FIG. 14) and a fourth upper placing position (see FIG. 18). The first top wall 112 of each first display cabinet 1 is stackable on the second bottom wall 211 of the second display cabinet 2 to be placed in a selected one of lower placing positions that are different from each other in the lengthwise direction (D1), and is positioned to the second display cabinet 2 by alignment and engagement of at least one of the first upper connecting portions 13 with a corresponding one of the second lower connecting portions 22 in the height direction (D2). The lower placing positions are a first lower placing position (see FIG. 11), a second lower placing position (see FIG. 17), a third lower placing position (see FIG. 14) and a fourth lower placing position (see FIG. 18).

In the first upper placing position or the first lower placing position, the left side 113 of the first display cabinet 1 is vertically aligned with the left side 213 of the second display cabinet 2 while the right side 114 projects laterally from the right side 214. In the first upper placing position, the second upper connecting portions 23 of the second display cabinet 2 are respectively engaged with the corresponding three first lower connecting portions 12. In the first lower placing position, two of the first upper connecting portions 13 of the first display cabinet 1 are respectively engaged with the corresponding two second lower connecting portions 22.

Figure 17:
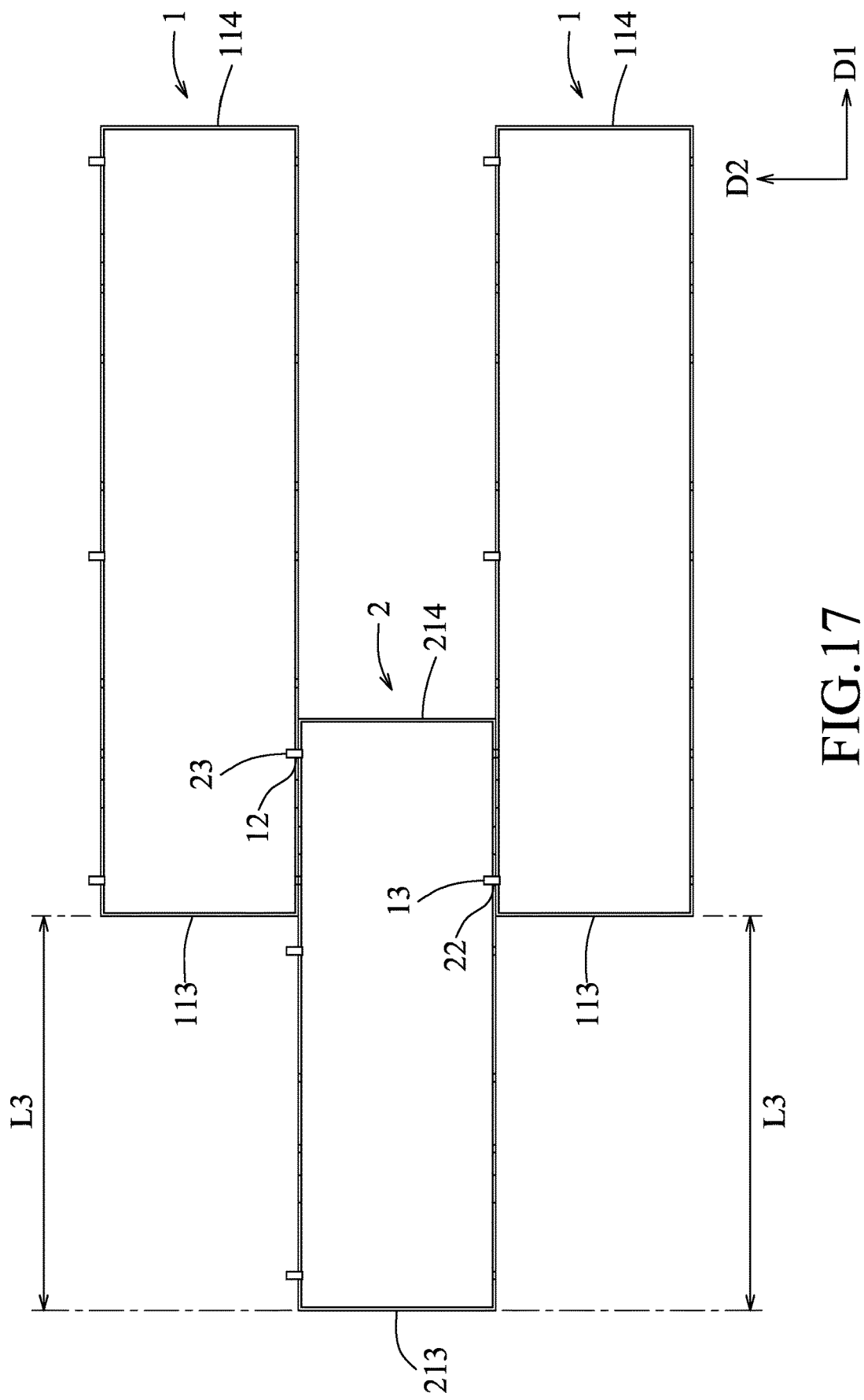

Referring to FIG. 17, in the second upper placing position or the second lower placing position, the left side 113 is distanced from the left side 213 in the lengthwise direction (D1) while the right side 114 projects laterally from the right side 214. In the second upper placing position, one of the second upper connecting portions 23 is engaged with the corresponding first lower connecting portion 12. In the second lower placing position, one of the first upper connecting portions 13 of the first display cabinet 1 is engaged with the corresponding second lower connecting portion 22.

Referring to FIG. 14, in the third upper placing position or the third lower placing position, the right side 114 is vertically aligned with the right side 214 while the left side 113 projects laterally from the left side 213. In the third upper placing position, the second upper connecting portions 23 of the second display cabinet 2 are respectively engaged with the corresponding three first lower connecting portions 12. In the third lower placing position, two of the first upper connecting portions 13 of the first display cabinet 1 are respectively engaged with the corresponding two second lower connecting portions 22.

Figure 18:
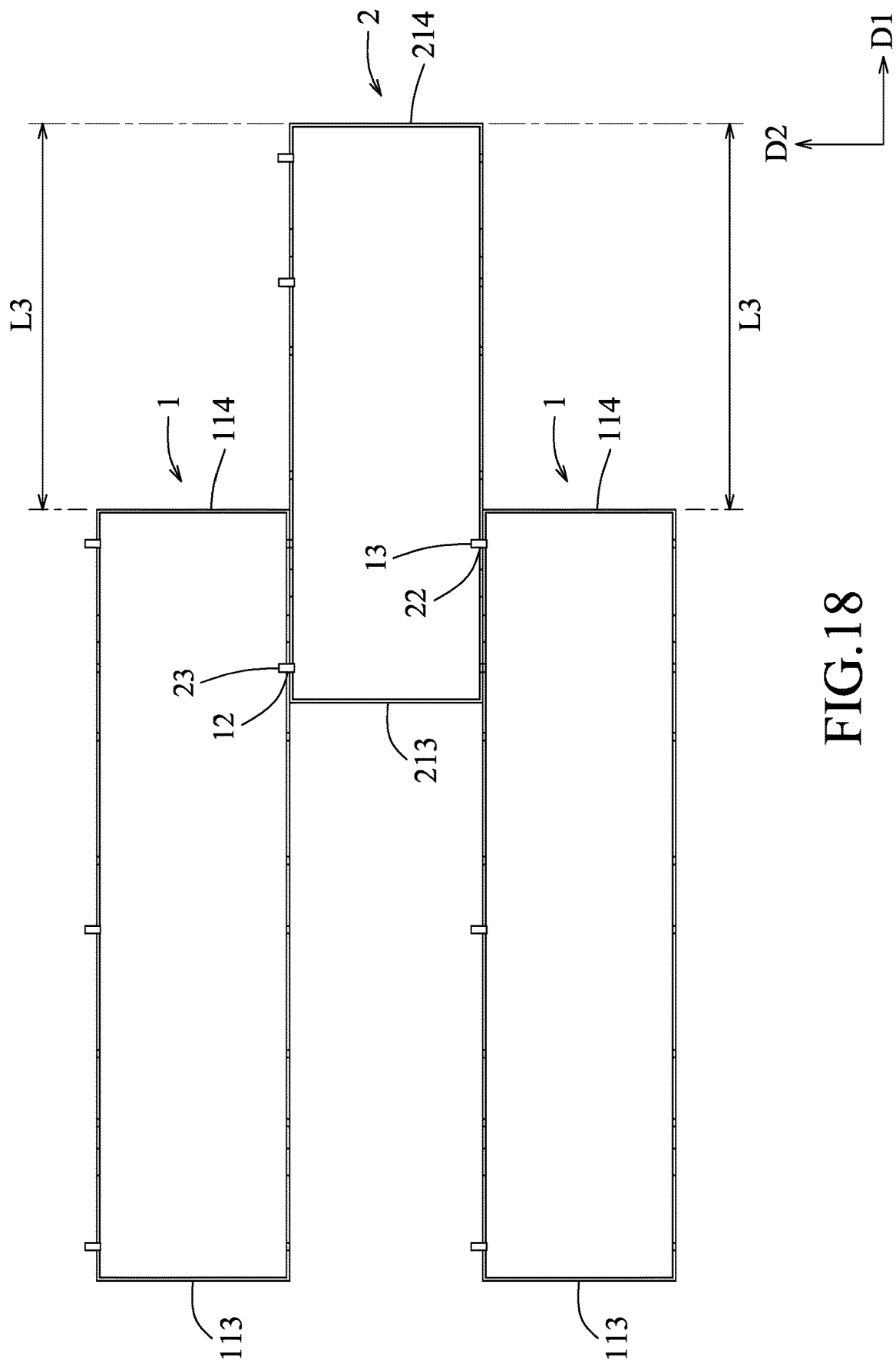

Referring to FIG. 18, in the fourth upper placing position or the fourth lower placing position, the right side 114 is distanced from the right side 214 by a distance with the third length (L3) while the left side 113 projects laterally from the left side 213. In the fourth upper placing position, one of the second upper connecting portions 23 of the second display cabinet 2 is engaged with the corresponding first lower connecting portion 12. In the fourth lower placing position, one of the first upper connecting portions 13 of the first display cabinet 1 is engaged with the corresponding second lower connecting portion 22.

Referring to FIG. 13, the third bottom wall 311 of each third display cabinet 3 is stackable on the first top wall 112 of the corresponding first display cabinet 1 to be placed in a selected one of upper attaching positions that are different from each other in the lengthwise direction (D1), and is positioned to the first display cabinet 1 by alignment and engagement of at least one of the third lower connecting portions 32 with a corresponding one of the first upper connecting portions 13 in the height direction (D2). The upper attaching positions are a first upper attaching position (see FIG. 13), a second upper attaching position (see FIG. 11), a third upper attaching position (see FIG. 16) and a fourth upper attaching position (see FIG. 14). The third top wall 312 of each third display cabinet 3 is stackable on the first bottom wall 111 of the corresponding first display cabinet 1 to be placed in a selected one of lower attaching positions that are different from each other in the lengthwise direction (D1), and is positioned to the first display cabinet 1 by alignment and engagement of at least one of the third upper connecting portions 33 with a corresponding one of the first lower connecting portions 12 in the height direction (D2). The lower attaching positions are a first lower attaching position (see FIG. 13), a second lower attaching position (see FIG. 11), a third lower attaching position (see FIG. 16) and a fourth lower attaching position (see FIG. 14).

In one of the first upper and lower attaching positions, the left side 313 of the third display cabinet 3 is vertically aligned with the left side 113 of the corresponding first display cabinet 1 while the right side 314 is distanced from the right side 114. In the first upper attaching position, two of the first upper connecting portions 13 of the first display cabinet 1 are respectively engaged with the third lower connecting portions 32. In the first lower attaching position, the third upper connecting portions 33 of the third display cabinet 3 are respectively engaged with the corresponding two first lower connecting portions 12.

Referring to FIG. 11, in one of the second upper and lower attaching positions, the left side 313 is distanced from the left side 113 by a distance with the second length (L2) while the right side 314 projects laterally from the right side 114. In the second upper attaching position, one of the first upper connecting portions 13 of the first display cabinet 1 is adjusted to be aligned and engaged with the corresponding third lower connecting portion 32. In the second lower attaching position, one of the third upper connecting portions 33 of the third display cabinet 3 is engaged with the corresponding first lower connecting portion 12.

Referring to FIG. 16, in one of the third upper and lower attaching positions, the right side 314 is vertically aligned with the right side 114 while the left side 313 is distanced from the left side 113. In the third upper attaching position, one of the first upper connecting portions 13 of the first display cabinet 1 is engaged with the corresponding third lower connecting portion 32. In the third lower attaching position, the third upper connecting portions 33 of the third display cabinet 3 are respectively engaged with the corresponding two first lower connecting portions 12.

Referring to FIG. 14, in one of the fourth upper and lower attaching positions, the right side 314 is distanced from the right side 114 by a distance with the second length (L2) while the left side 313 projects laterally from the left side 113. In the fourth upper attaching position, one of the first upper connecting portions 13 of the first display cabinet 1 is adjusted to be aligned and engaged with the corresponding third lower connecting portion 32 of the third display cabinet 3. In the fourth lower attaching position, one of the third upper connecting portions 33 of the third display cabinet 3 is engaged with the corresponding first lower connecting portion 12.

Figure 19:
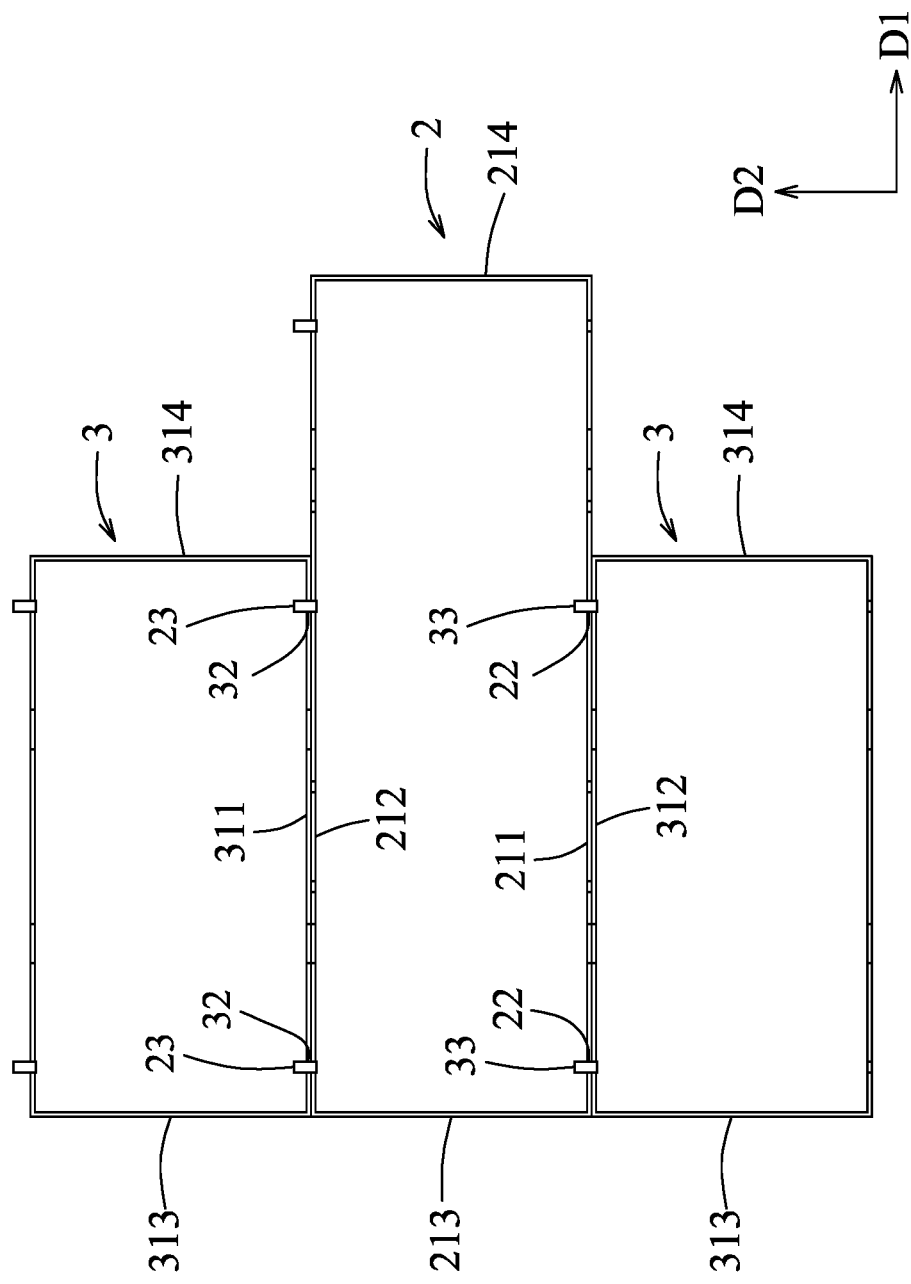

Referring to FIG. 19, the third bottom wall 311 of each third display cabinet 3 is stackable on the second top wall 212 of the corresponding second display cabinet 2 to be placed in a selected one of upper supporting positions that are different from each other in the lengthwise direction (D1), and is positioned to the second display cabinet 2 by alignment and engagement of at least one of the third lower connecting portions 32 with a corresponding one of the second upper connecting portions 23 in the height direction (D2). The upper supporting positions are a first upper supporting position (see FIG. 19), a second upper supporting position (see FIG. 20), a third upper supporting position (see FIG. 21) and a fourth upper supporting position (see FIG. 22). The third top wall 312 of each third display cabinet 3 is stackable on the second bottom wall 211 of the corresponding second display cabinet 2 to be placed in a selected one of lower supporting positions that are different from each other in the lengthwise direction (D1), and is positioned to the second display cabinet 2 by alignment and engagement of at least one of the third upper connecting portions 33 with a corresponding one of the second lower connecting portions 22 in the height direction (D2). The lower supporting positions are a first lower supporting position (see FIG. 19), a second lower supporting position (see FIG. 20), a third lower supporting position (see FIG. 21) and a fourth lower supporting position (see FIG. 22).

In one of the first upper and lower supporting positions, the left side 313 of the third display cabinet 3 is vertically aligned with the left side 213 of the corresponding second display cabinet 2 while the right side 314 is distanced from the right side 214. In the first upper supporting position, two of the second upper connecting portions 23 of the second display cabinet 2 are respectively engaged with the third lower connecting portions 32. In the first lower supporting position, the third upper connecting portions 33 of the third display cabinet 3 are respectively engaged with the corresponding two second lower connecting portions 22.

Figure 20:
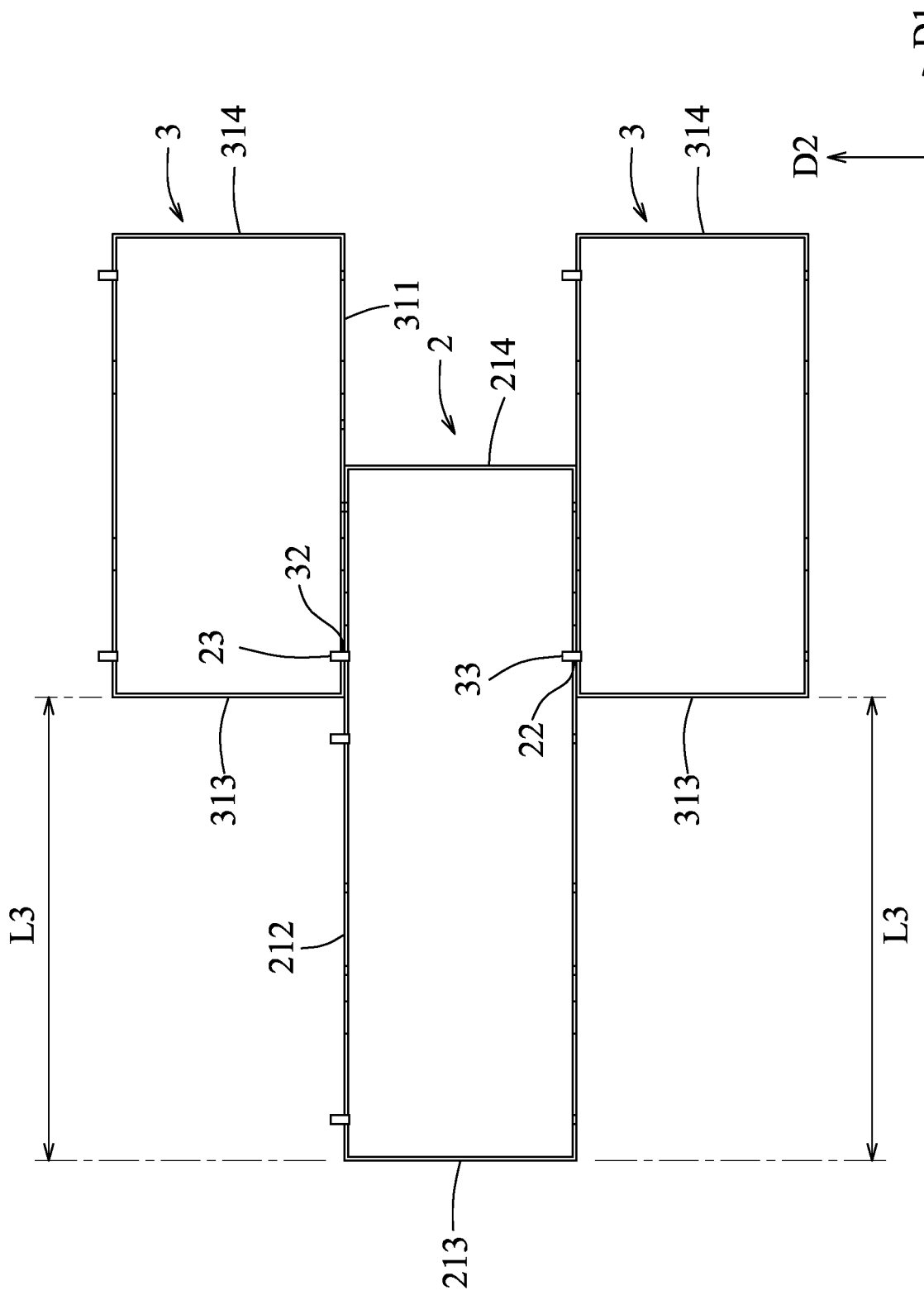

Referring to FIG. 20, in one of the second upper and lower supporting positions, the left side 313 is distanced from the left side 213 by a distance with the third length (L3) while the right side 314 projects laterally from the right side 214. In the second upper supporting position, one of the second upper connecting portions 23 of the second display cabinet 2 is adjusted to be aligned and engaged with the corresponding third lower connecting portion 32 of the third display cabinet 3. In the second lower supporting position, one of the third upper connecting portions 33 of the third display cabinet 3 is engaged with the corresponding second lower connecting portion 22.

Figure 21:
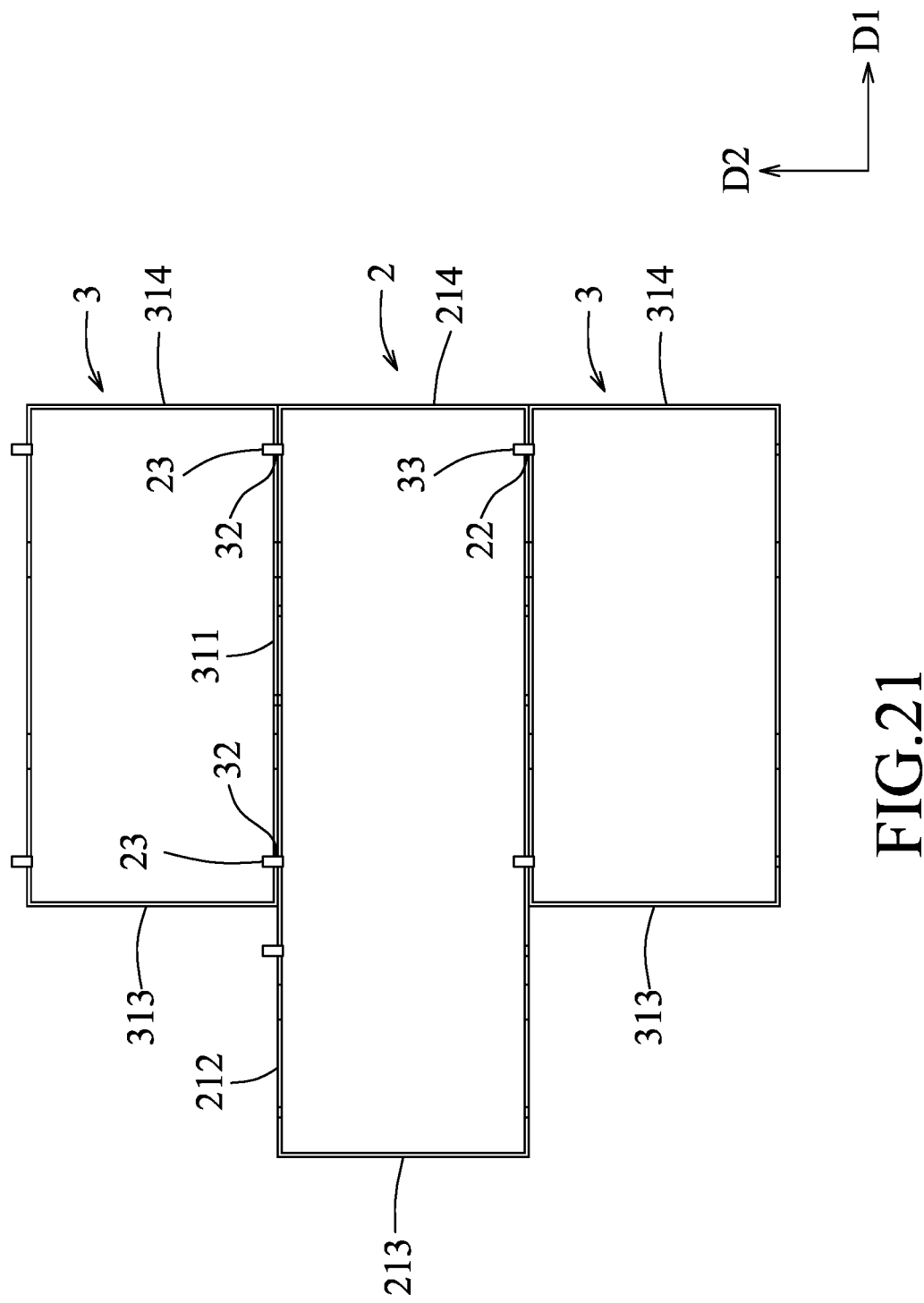

Referring to FIG. 21, in one of the third upper and lower supporting positions, the right side 314 is vertically aligned with the right side 214 while the left side 313 is distanced from the left side 213. In the third upper supporting position, a right one of the second upper connecting portions 23 of the second display cabinet 2 is engaged with the corresponding third lower connecting portion 32, and a middle one of the second upper connecting portions 23 is adjusted leftwardly to be aligned and engaged with another corresponding third lower connecting portion 32 of the third display cabinet 3. In the third lower supporting position, the third upper connecting portions 33 of the third display cabinet 3 are respectively engaged with the corresponding two second lower connecting portions 22.

Figure 22:
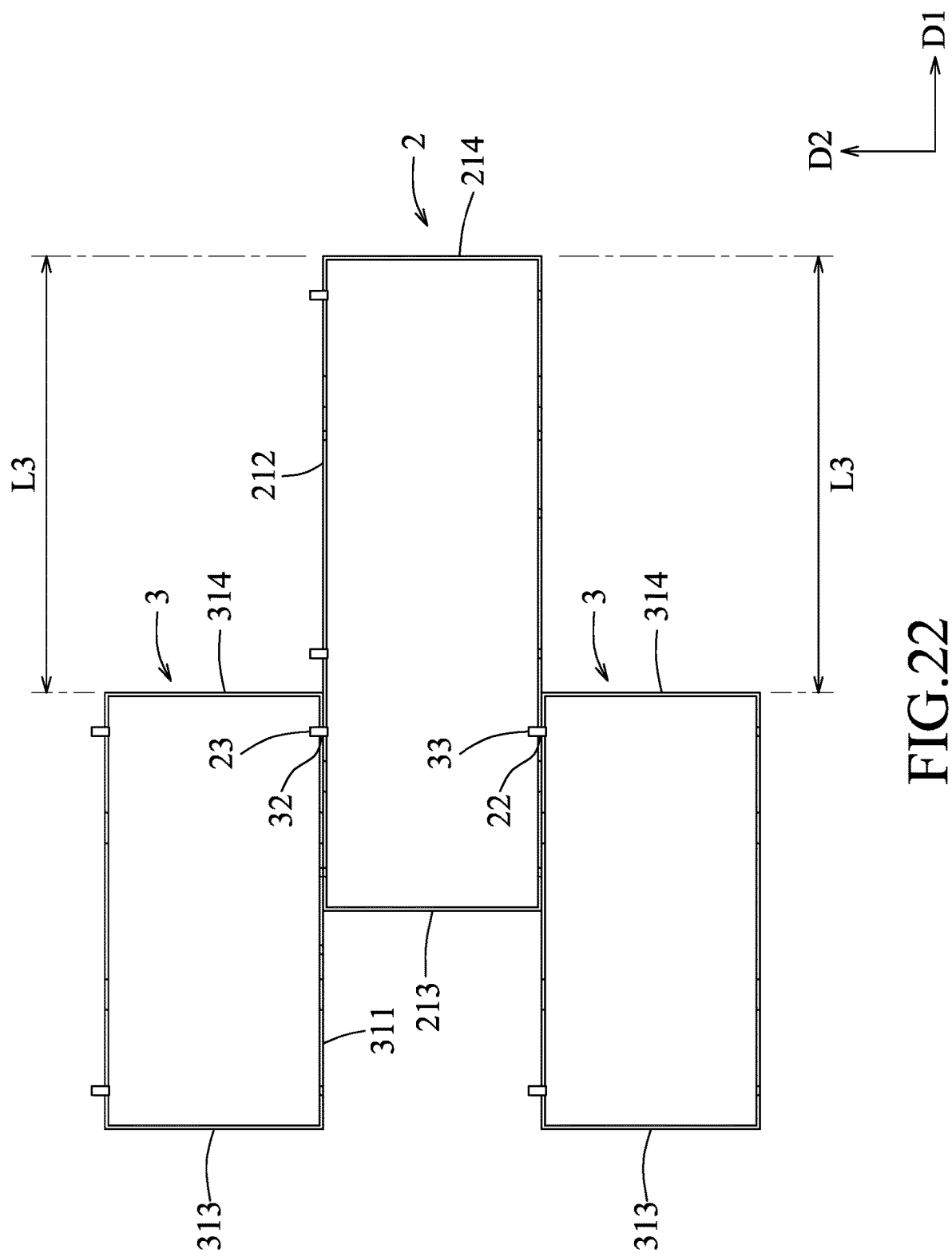

Referring to FIG. 22, in one of the fourth upper and lower supporting positions, the right side 314 is distanced from the right side 214 by a distance with the third length (L3) while the left side 313 projects laterally from the left side 213. In the fourth upper supporting position, a left one of the second upper connecting portions 23 of the second display cabinet 2 is adjusted rightwardly to be aligned and engaged with the corresponding third lower connecting portion 32 of the third display cabinet 3. In the fourth lower supporting position, one of the third upper connecting portions 33 of the third display cabinet 3 is engaged with the corresponding second lower connecting portion 22.

Similarly, each of the first display cabinets 1 is stackable on and positioned to a selected one of the third top and bottom walls 311, 312 of a corresponding one of the third display cabinets 3 to be placed in a selected one of connecting positions that are different from each other in the lengthwise direction (D1). Each of the second display cabinets 2 is stackable on and positioned to a selected one of a third top and bottom walls 311, 312 of a corresponding one of the third display cabinets 3 to be placed in a selected one of engaging positions that are different from each other in the lengthwise direction (D1). The detailed descriptions thereof are dispensed therewith for the sake of brevity.

An installation method for the multi-screen display installation device 100 includes: step S1 which is providing display cabinets of a multi-screen display installation device; step S2 which is setting an installation size; step S3 which is selecting the display cabinets; and step S4 which is adjoining the selected display cabinets.

With reference to FIGS. 1, 2, 3 and 23, in step S1, a plurality of first display cabinets 1, a plurality of second display cabinets 2 and a plurality of third display cabinets 3 of the multi-screen display installation device 100 are provided.

Figure 23:
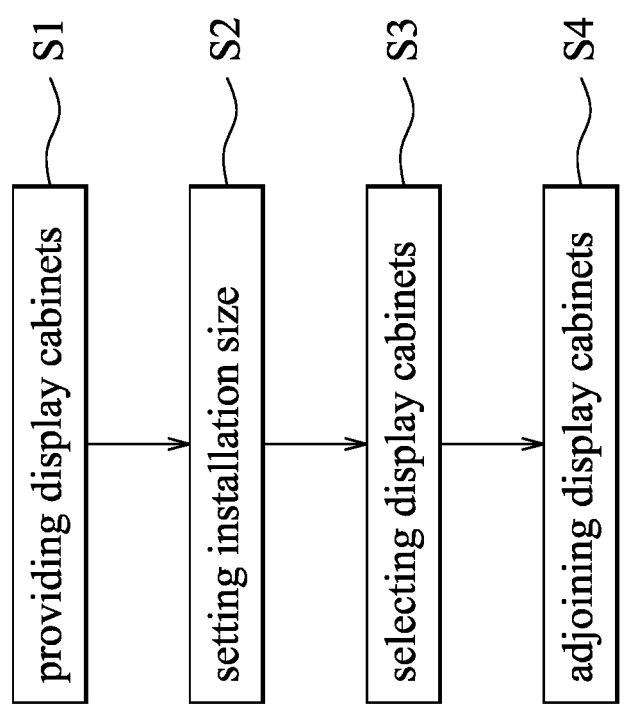
FIG. 23 is a process diagram of the process steps of the installation method of the embodiment.
Figure 24:
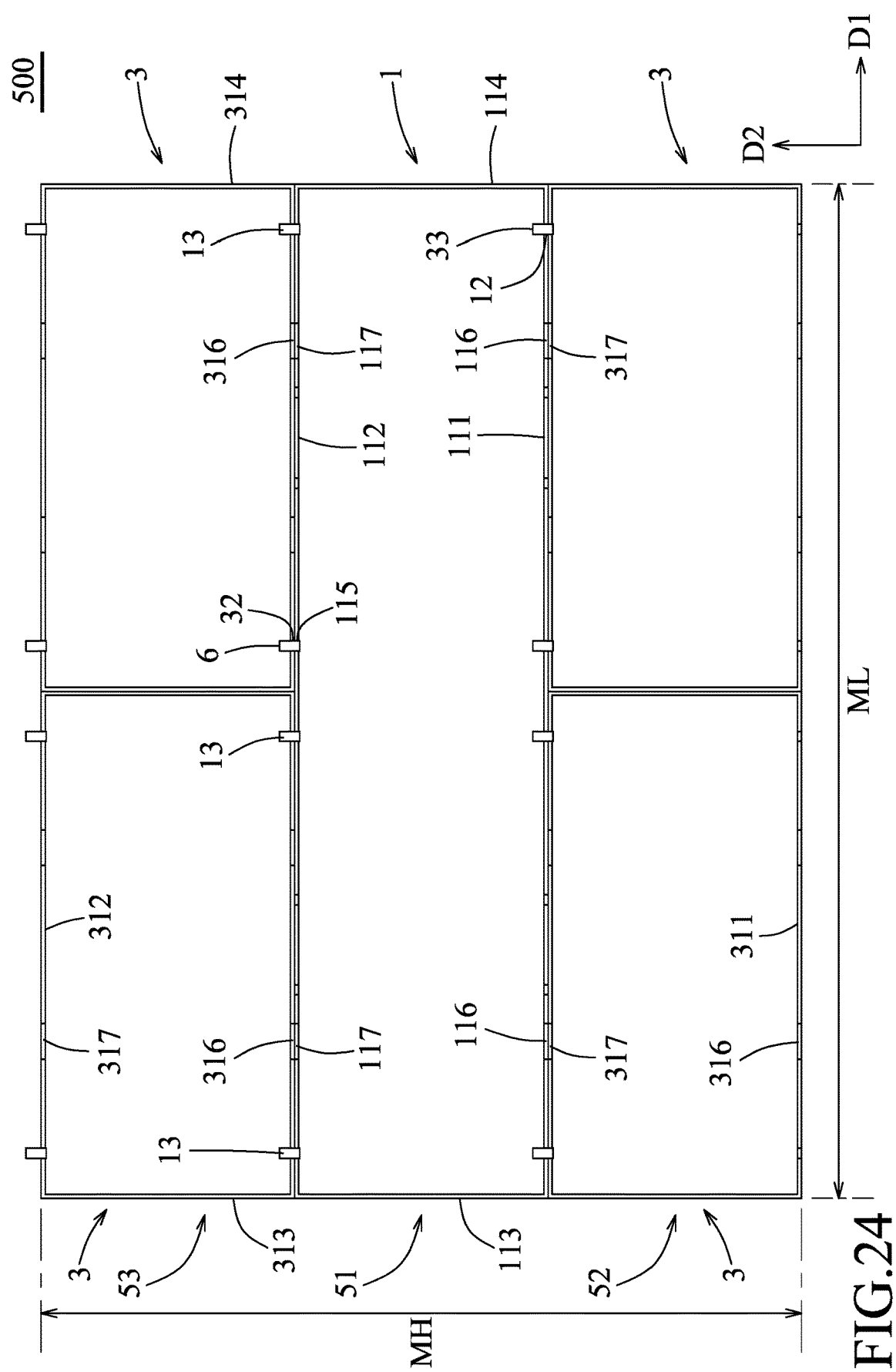
FIGS. 24 to 30 are schematic views illustrating a variety of multi-screen frames installed by the embodiment, respectively.

With reference to FIGS. 23 and 24, in step S2, an installation size is set. The installation size has an installation length (ML) in the lengthwise direction (D1), and an installation height (MH) in the height direction (D2). In this embodiment, the installation length (ML) is set to 1000 mm, and the installation height (MH) is set to 750 mm.

Subsequently, in step S3, at least two display cabinets from the first, second and third display cabinets 1, 2, 3 with different lengths are selected so as to be combined with each other to form as a display installation device with the installation length (ML) and the installation height (MH). In this embodiment shown in FIG. 24, one first display cabinet 1 and four third display cabinets 3 are selected.

Subsequently, in step S4, the selected display cabinets are adjoined with each other to form a multi-screen frame 500 that meets the installation height (MH) and the installation length (ML). The multi-screen frame 500 includes at least two structural units stacked on each other in the height direction (D2) and composed of at least two display cabinets 1, 2, 3 with different lengths, respectively. Each of the structural units has at least one display cabinet 1, 2, 3. For example, the multi-screen frame 500 has a middle structural unit 51, a lower structural unit 52 and an upper structural unit 53. As shown in FIG. 24, the middle structural unit 51 has a first display cabinet 1. The lower structural unit 52 has two third display cabinets 3 adjoined with each other in the lengthwise direction (D1) and stacked on the first bottom wall 111 of the first display cabinet 1. The two third display cabinets 3 are placed in the first lower attaching position and the third lower attaching position, respectively. The upper structural unit 53 has another two third display cabinets 3 adjoined with each other in the lengthwise direction (D1) and stacked on the first top wall 112 of the first display cabinet 1. The two third display cabinets 3 are placed in the first upper attaching position and the third upper attaching position, respectively. The assembled multi-screen frame 500 has a front side for coupling and carrying the corresponding display module(s) 4 (see FIG. 4). Thus, the multi-screen frame 500 and the carried display module(s) 4 are cooperatively formed as a display screen.

In this embodiment shown in FIG. 24, an extra threaded bolt 6 may be threadedly engaged in one of the first threaded holes 115 in the first display cabinet 1 and engaged in one of the lower connecting portions 32 of the third display cabinet 3 placed in the third upper attaching position. With the extra threaded bolt 6 engaged with the corresponding third display cabinet 3, the third display cabinet 3 is positioned to the first display cabinet 1 firmly and precisely such that the upper structural unit 53 is steadily positioned to the middle structural unit 51. Through the third upper connecting portions 33 of each third display cabinet 3 of the lower structural unit 52 engaged in the corresponding first lower connecting portions 12 of the first display cabinet 1, the lower structural unit 52 is steadily positioned to the middle structural unit 51.

Further, as shown in FIG. 24, the first lower splits 116 of the first display cabinet 1 are respectively formed adjacent to the left and right sides 113, 114, and are aligned with the corresponding third upper splits 317 of the two third display cabinets 3 of the lower structural unit 52, respectively. The first upper splits 117 of the first display cabinet 1 are respectively formed adjacent to the left and right sides 113, 114, and are aligned with the corresponding third lower splits 316 of the two third display cabinets 3 of the upper structural unit 53, respectively. Thus, the aligned splits 116, 317 or 117, 316 may be enlarged and formed as a wiring hole for running of a signal wire and a power wire therethrough. Furthermore, an enlarging operation of the third lower splits 316 of each third display cabinet 3 of the lower structural unit 52 and that of the third upper splits 317 of each third display cabinet 3 of the upper structural unit 53 are not required for wiring, which reduces the risk of exposure of inside component parts in the lower and upper structural units 52, 53 out of the third bottom walls 311 and the third top walls 312.

Figure 25:
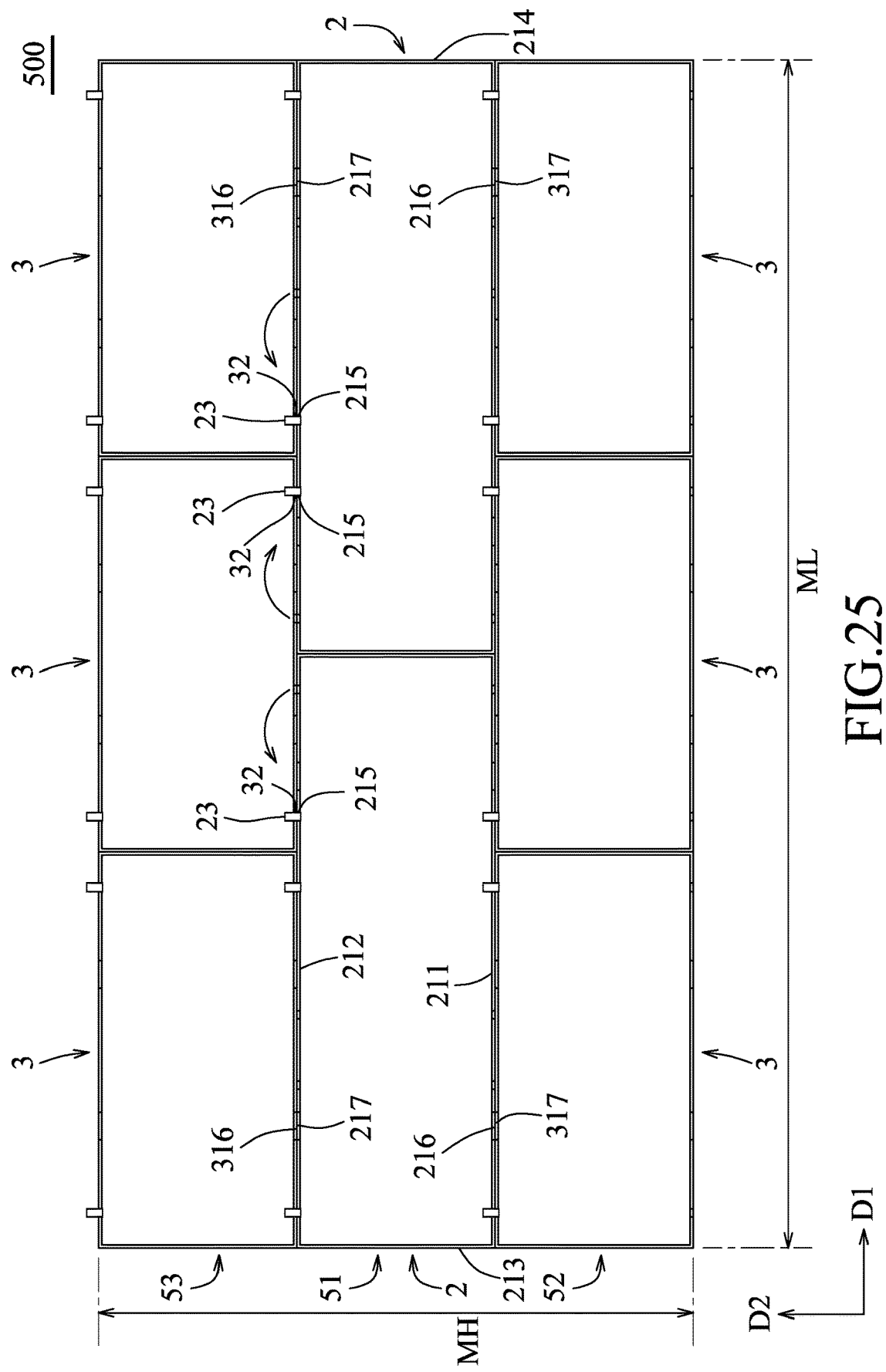

Another embodiment of the multi-screen frame 500 is illustrated in FIG. 25. As shown in FIGS. 23 and 25, in step S2, the installation length (ML) is set to 1500 mm. In step S3, two second display cabinets 2 and six third display cabinets 3 are selected. In step S4, the middle structural unit 51 has the two second display cabinets 2 adjoined with each other in the lengthwise direction (D1). The lower structural unit 52 has three third display cabinets 3 adjoined with one another in the lengthwise direction (D1) and stacked on the second bottom walls 211 of the two second display cabinets 2. Those third display cabinets 3 are placed in the first lower supporting position, the second lower supporting position (or the fourth lower supporting position) and the third lower supporting position, respectively. The upper structural unit 53 has another three third display cabinets 3 adjoined with one another in the lengthwise direction (D1) and stacked on the second top walls 212 of the two second display cabinets 2. Those third display cabinets 3 are placed in the first upper supporting position, the second upper supporting position (or the fourth upper supporting position) and the fourth upper supporting position, respectively.

In this embodiment shown in FIG. 25, during assembly, one of the second upper connecting portions 23 of each second display cabinet 2 is adjusted to be aligned and engaged with the corresponding third lower connecting portion 32 of the third display cabinet 3 placed in the second upper supporting position (or the fourth upper supporting position). Thus, this third display cabinet 3 can be positioned firmly in the second upper supporting position (or the fourth upper supporting position). Also, one of the second upper connecting portions 23 of the right second display cabinet 2 is adjusted to be aligned and engaged with the corresponding third lower connecting portion 32 of the third display cabinet 3 placed in the third upper supporting position so as to position firmly this third display cabinet 3 in the third upper supporting position. Those adjustment operations are convenient to conduct by removing the second upper connecting portions 23 from the second threaded holes 215 and having the second upper connecting portions 23 threadedly engaged in another second threaded holes 215 that are aligned with the corresponding third lower connecting portions 32.

As shown in FIG. 25, furthermore, the second lower splits 216 of the two second display cabinets 2 are respectively formed adjacent to the left and right sides 213, 214 thereof, and are aligned with the corresponding third upper splits 317 of the two third display cabinets 3 of the lower structural unit 52, respectively. The second upper splits 217 of the two second display cabinets 2 are respectively formed adjacent to the left and right sides 213, 214 thereof, and are aligned with the corresponding third lower splits 316 of the two third display cabinets 3 of the upper structural unit 53, respectively. Thus, the aligned splits 216, 317 or 217, 316 may be enlarged and formed as a wiring hole for running of a signal wire and a power wire therethrough.

Figure 26:
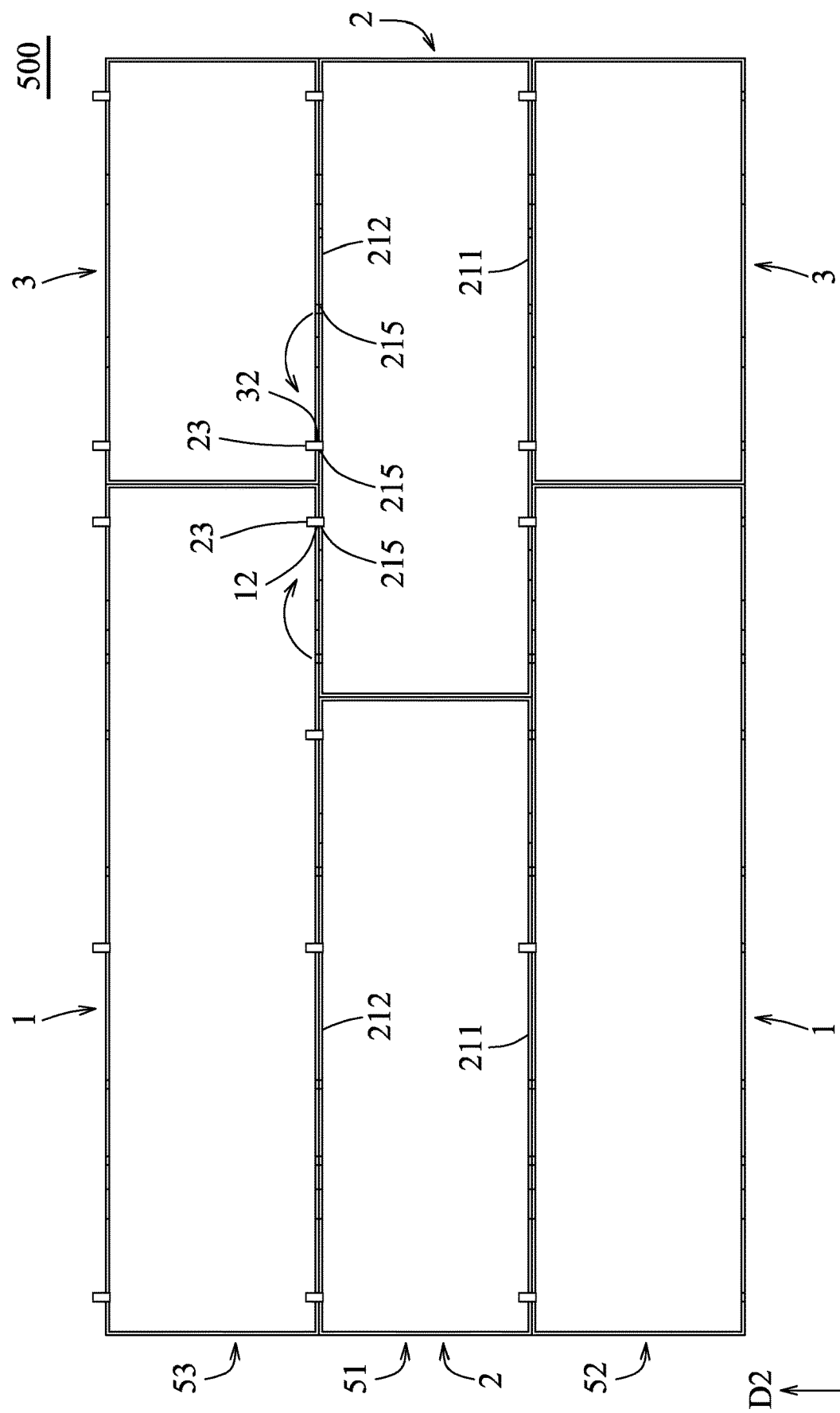

Another embodiment of the multi-screen frame 500 is illustrated in FIG. 26. As shown in FIGS. 23 and 26, in step S3, two second display cabinets 2, two first display cabinets 1 and two third display cabinets 3 are selected. In step S4, the middle structural unit 51 has the two second display cabinets 2 adjoined with each other in the lengthwise direction (D1). The lower structural unit 52 has a first display cabinet 1 and a third display cabinet 3 adjoined with each other in the lengthwise direction (D1) and stacked on the second bottom walls 211 of the two second display cabinets 2. Those first and third display cabinets 1, 3 are placed in the first lower placing position and the third lower supporting position, respectively. The upper structural unit 53 has the other first display cabinet 1 and the other third display cabinet 3 adjoined with each other in the lengthwise direction (D1) and stacked on the second top walls 212 of the two second display cabinets 1. Those first and third display cabinets 1, 3 are placed in the first upper placing position and the third upper supporting position, respectively.

In this embodiment shown in FIG. 26, during assembly, one of the second upper connecting portions 23 of the right second display cabinet 2 is adjusted leftwardly to be aligned and engaged with the corresponding third lower connecting portion 32 of the third display cabinet 3 so as to position firmly this third display cabinet 3 in the third upper supporting position. Also, one of the second upper connecting portions 23 of the right second display cabinet 2 is adjusted rightwardly to be aligned and engaged with the corresponding first lower connecting portion 12 of the first display cabinet 1 so as to position firmly and precisely this first display cabinet 1 in the first upper placing position. Those adjustment operations are convenient to conduct by removing the second upper connecting portions 23 from the second threaded holes 215 and having the second upper connecting portions 23 threadedly engaged in another second threaded holes 215 that are aligned with the corresponding third and first lower connecting portions 32, 12.

Figure 27:
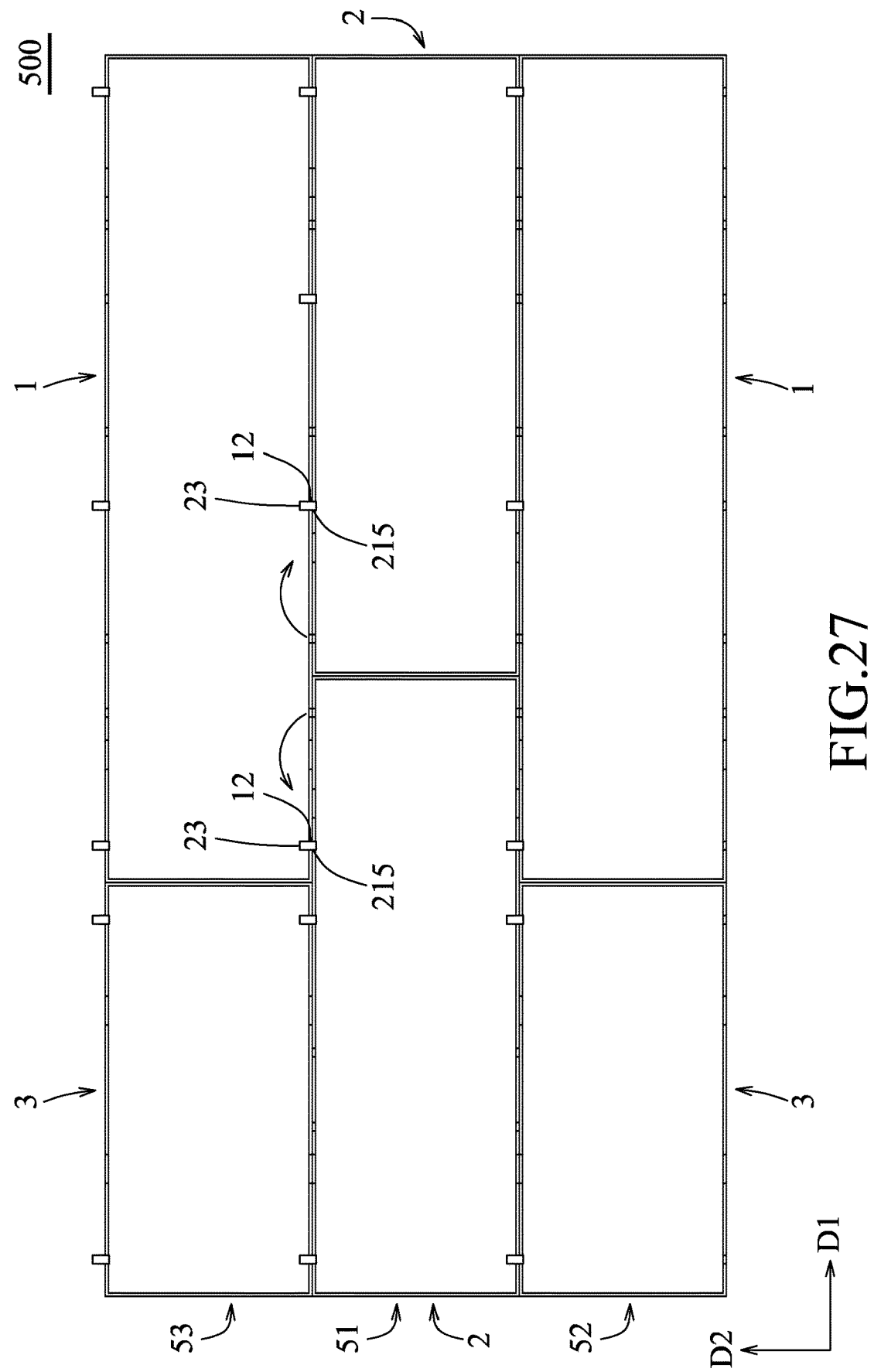

Alternatively, another embodiment of the multi-screen frame 500 is illustrated in FIG. 27. As shown in FIGS. 23 and 27, in step S4, the middle structural unit 51 has two second display cabinets 2 adjoined with each other in the lengthwise direction (D1). The lower structural unit 52 has a third display cabinet 3 and a first display cabinet 1 adjoined with each other in the lengthwise direction (D1) and stacked on the second bottom walls 211 of the two second display cabinets 2. Those third and first display cabinets 3, 1 are placed in the first lower supporting position and the third lower placing position (or the second lower placing position), respectively. The upper structural unit 53 has the other third display cabinet 3 and the other first display cabinet 1 adjoined with each other in the lengthwise direction (D1) and stacked on the second top walls 212 of the two second display cabinets 2. Those third and first display cabinets 3, 1 are placed in the first upper supporting position and the third upper placing position (or the second upper placing position), respectively.

In this embodiment shown in FIG. 27, during assembly, one of the second upper connecting portions 23 of the left second display cabinet 2 is adjusted leftwardly to be aligned and engaged with the corresponding first lower connecting portion 12 of the first display cabinet 1 of the upper structural unit 53. Also, one of the second upper connecting portions 23 of the right second display cabinet 2 is adjusted rightwardly to be aligned and engaged with the corresponding first lower connecting portion 12 of the first display cabinet 1 so as to position firmly and precisely this first display cabinet 1 in its first placing position. Those adjustment operations are convenient to conduct by removing the second upper connecting portions 23 from the second threaded holes 215 and having the second upper connecting portions 23 threadedly engaged in another second threaded holes 215 that are aligned with the corresponding first lower connecting portions 12.

Figure 28:
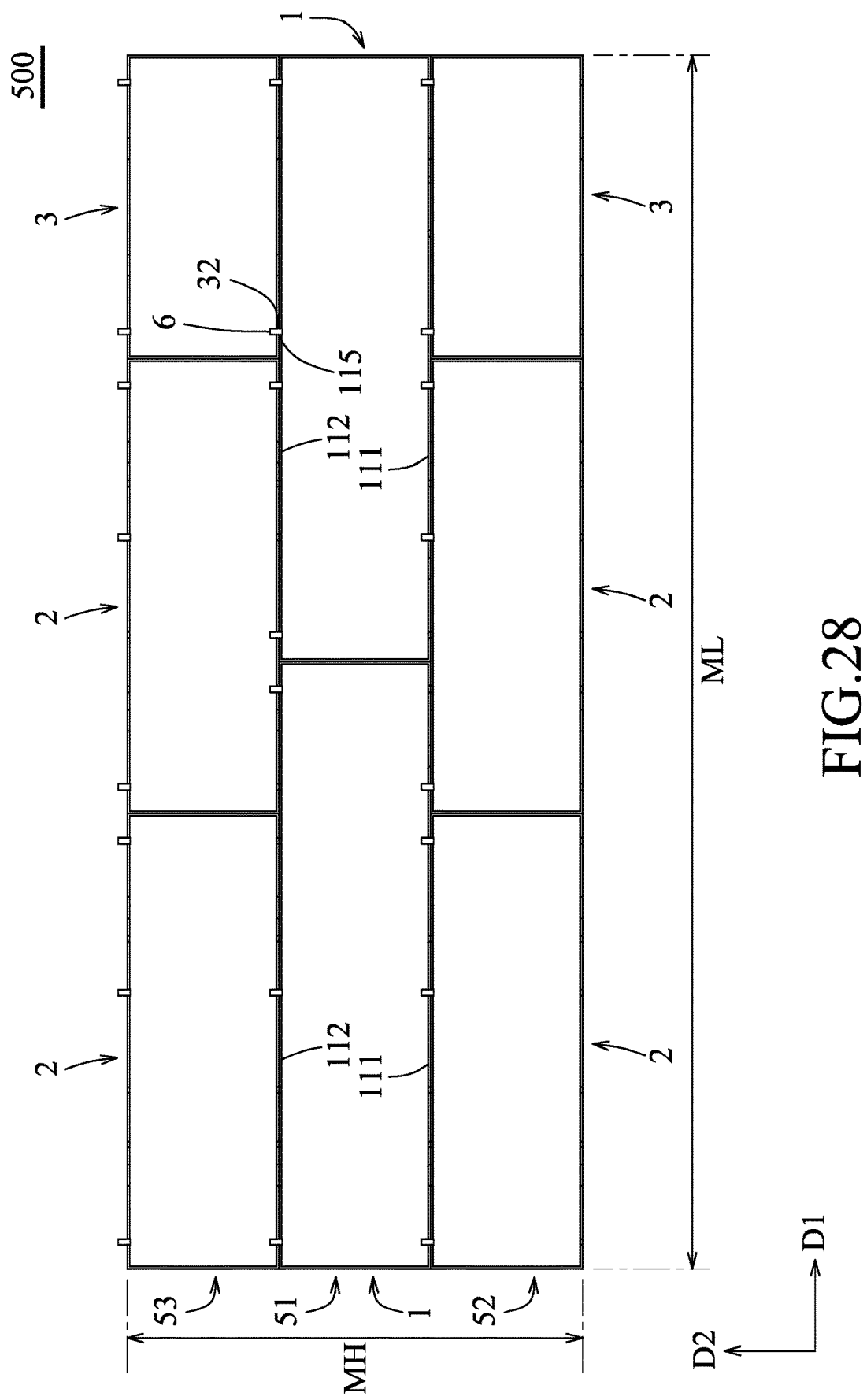

Another embodiment of the multi-screen frame 500 is illustrated in FIG. 28. As shown in FIGS. 23 and 28, in step S2, the installation length (ML) is set to 2000 mm. In step S3, two first display cabinets 1, four second display cabinets 2 and two third display cabinets 3 are selected. In step S4, the middle structural unit 51 has the two first display cabinets 1 adjoined with each other in the lengthwise direction (D1). The lower structural unit 52 has two second display cabinets 2 and a third display cabinet 3 adjoined with one another in the lengthwise direction (D1) and stacked on the first bottom walls 111 of the two first display cabinets 1. The two second display cabinets 2 and the third display cabinet 3 are placed in the first lower stacking position, the second lower stacking position (or the sixth lower stacking position), and the third lower attaching position, respectively. The upper structural unit 53 has another two second display cabinets 2 and another third display cabinet 3 adjoined with one another in the lengthwise direction (D1) and stacked on the first top walls 112 of the two first display cabinets 1. These two second display cabinets 2 and the third display cabinet 3 are placed in the first upper stacking position, the second upper stacking position (or the sixth upper stacking position), and the third upper attaching position, respectively.

In this embodiment shown in FIG. 28, an extra threaded bolt 6 may be threadedly engaged in one of the first threaded holes 115 in the right first display cabinet 1 and engaged in one of the third lower connecting portions 32 of the third display cabinet 3 of the upper structural unit 53 so as to position firmly and precisely the third display cabinet 3 to the first display cabinet 1.

Figure 29:
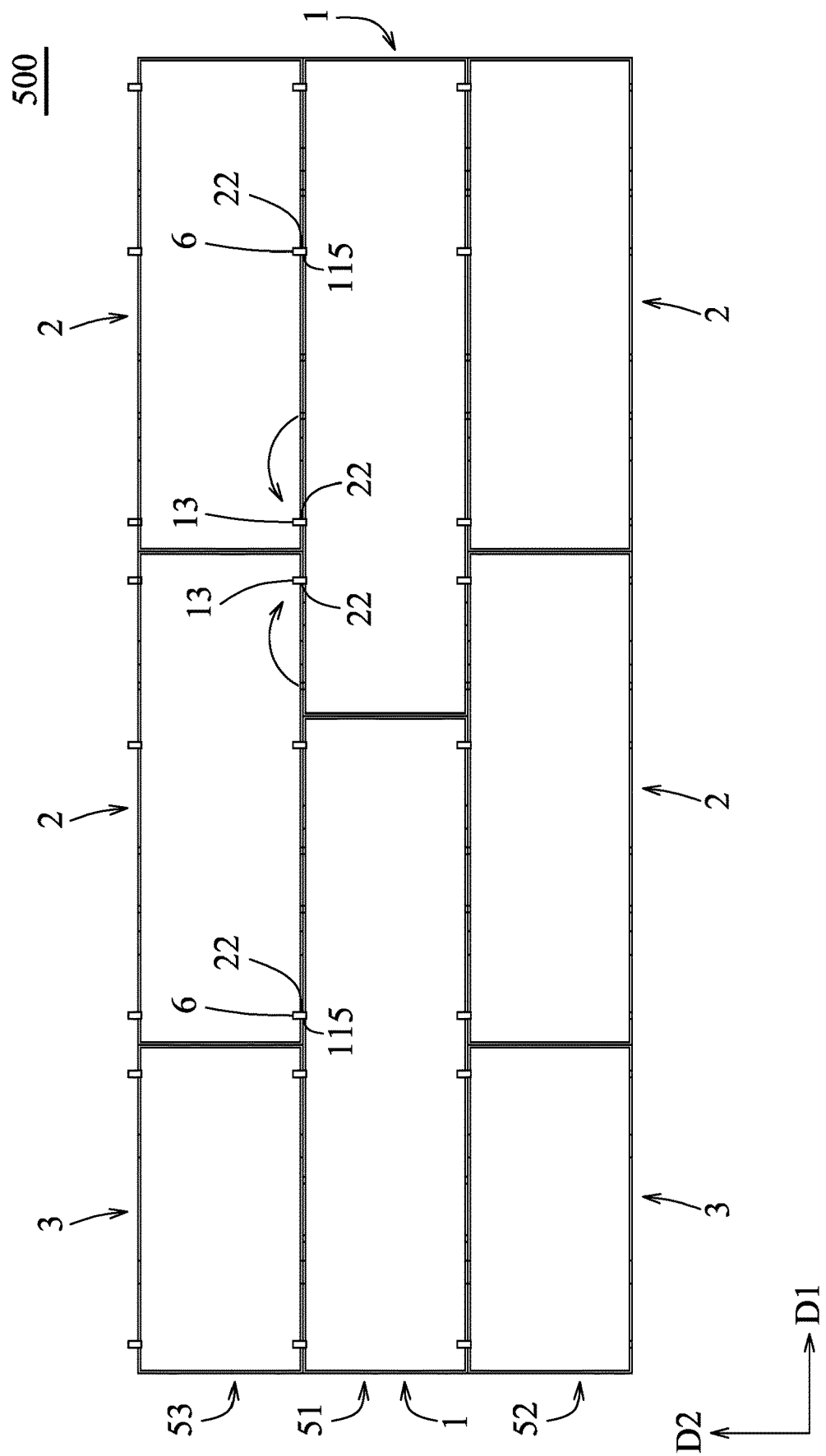

Alternatively, another embodiment of the multi-screen frame 500 is illustrated in FIG. 29. As shown in FIGS. 23 and 29, in step S4, the lower structural unit 52 has a third display cabinet 3 and two second display cabinets 2 adjoined with one another in the lengthwise direction (D1) and placed in the first lower attaching position, the third lower stacking position (or the fifth lower stacking position), and the fourth lower stacking position, respectively. The upper structural unit 53 has another third display cabinet 3 and another two second display cabinets 2 adjoined with one another in the lengthwise direction (D1) and placed in the first upper attaching position, the third upper stacking position (or the fifth upper stacking position), and the fourth upper stacking position, respectively.

In this embodiment shown in FIG. 29, an extra threaded bolt 6 may be threadedly engaged in one of the first threaded holes 115 in the left first display cabinet 1 and engaged in one of the second lower connecting portions 22 of the second display cabinet 2 placed in the third upper stacking position. Another threaded bolt 6 may be threadedly engaged in one of the first threaded holes 115 of the right first display cabinet 1 and engaged in one of the second lower connecting portions 22 of the second display cabinet 2 placed in the fourth upper stacking position. Moreover, one of the first upper connecting portions 13 of the right first display cabinet 1 is adjusted rightwardly to be aligned and engaged with the corresponding second lower connecting portion 22 of the second display cabinet 2 placed in the third upper stacking position. Another one of the first upper connecting portions 13 of the right first display cabinet 1 is adjusted leftwardly to be aligned and engaged with the corresponding second lower connecting portion 22 of the second display cabinet 2 placed in the fourth upper stacking position. Thus, the second display cabinets 2 of the upper structural unit 53 can be positioned firmly and precisely to the middle structural unit 51.

Figure 30:
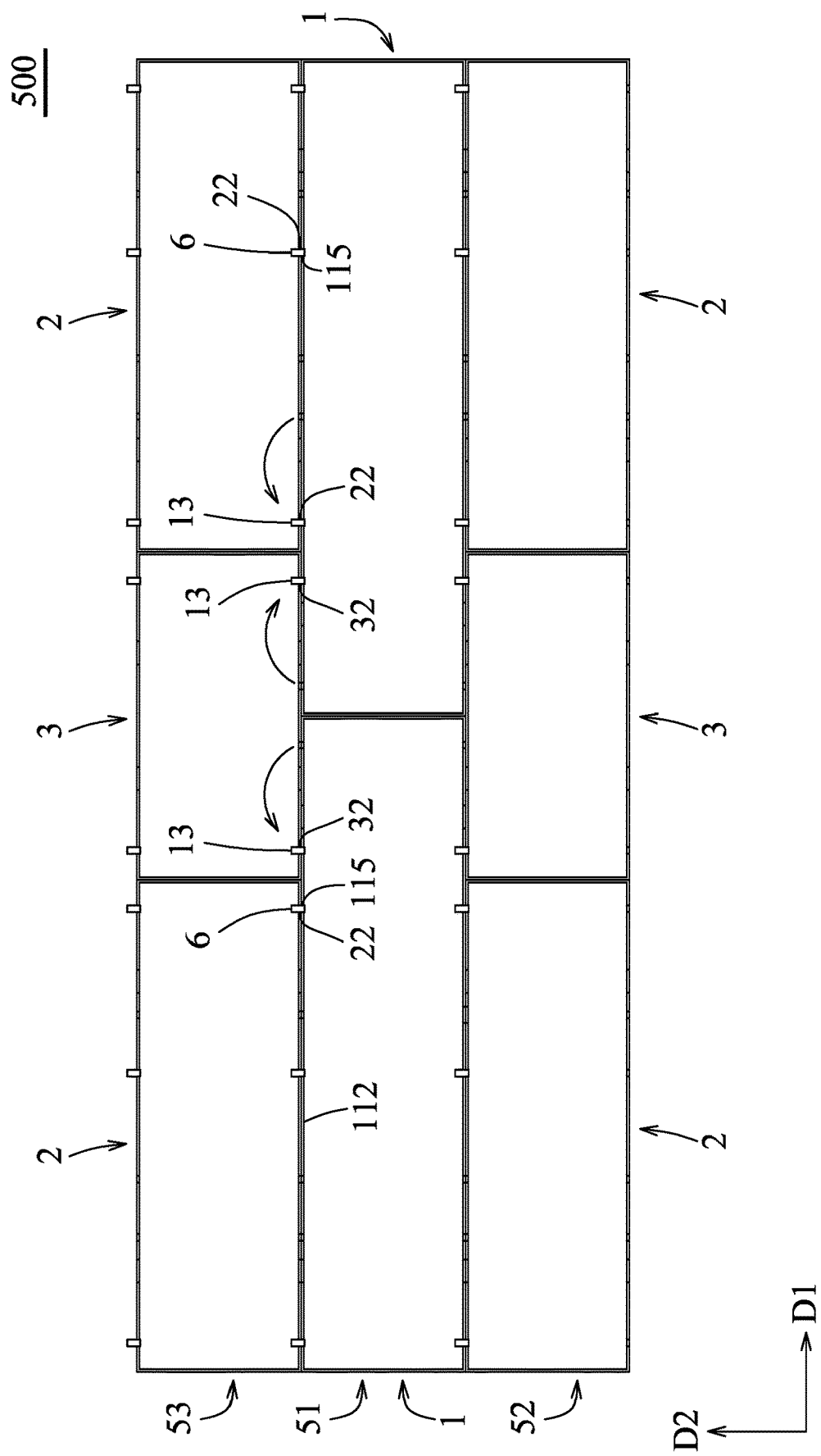

Alternatively, another embodiment of the multi-screen frame 500 is illustrated in FIG. 30. As shown in FIGS. 23 and 30, in step S4, the lower structural unit 52 has a second display cabinet 2, a third display cabinet 3 and another second display cabinet 2 adjoined with one another in the lengthwise direction (D1) and placed in the first lower stacking position, the second lower attaching position (or the fourth lower attaching position), and the fourth lower stacking position, respectively. The upper structural unit 53 has a second display cabinet 2, a third display cabinet 3 and another second display cabinet 2 adjoined with one another in the lengthwise direction (D1) and placed in the first upper stacking position, the second upper attaching position (or the fourth upper attaching position), and the fourth upper stacking position, respectively.

In this embodiment shown in FIG. 30, during assembly, an extra threaded bolt 6 may be threadedly engaged in one of the first threaded holes 115 in the left first display cabinet 1 and engaged in one of the second lower connecting portions 22 of the second display cabinet 2 placed in the first upper stacking position. Another threaded bolt 6 may be threadedly engaged in one of the first threaded holes 115 of the right first display cabinet 1 and engaged in one of the second lower connecting portions 22 of the second display cabinet 2 placed in the fourth upper stacking position.

Moreover, one of the first upper connecting portions 13 of the right first display cabinet 1 is adjusted leftwardly to be aligned and engaged with the corresponding second lower connecting portion 22 of the second display cabinet 2 placed in the fourth upper stacking position. Another one of the first upper connecting portions 13 of the right first display cabinet 1 is adjusted rightwardly to be aligned and engaged with the corresponding third lower connecting portion 32 of the third display cabinet 3 placed in the second upper attaching position. One of the first upper connecting portions 13 of the left first display cabinet 1 is adjusted leftwardly to be aligned and engaged with the corresponding third lower connecting portion 32 of the third display cabinet 3 placed in the second upper attaching position. Thus, the third display cabinet 3 of the upper structural unit 53 can be positioned firmly to the first top walls 112 of the first display cabinets 1.

It should be noted that the multi-screen frame 500 has a rectangular shape in the previous embodiments, and may be of different in shape. Also, the multi-screen frame 500 may have two or more than three structural units. Alternatively, each of the first, second and third lower connecting portions 12, 22, 32 may be in the form of a threaded bolt, and each of the first, second and third upper connecting portions 13, 23, 33 may be in the form of a positioning hole.

As illustrated, with the first, second and third display cabinets 1, 2, 3 selected and stackable and adjoined with each other, and their upper and lower connecting portions engaged with each other, two of the display cabinets 1, 2, 3 can be easily and readily stacked on and positioned to each other to form a desired multi-screen display installation device 100, which saves assembling and disassembling time and costs.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A multi-screen display installation device comprising:
 a first display cabinet defining a first length in a lengthwise direction, said first display cabinet including a plurality of first lower connecting portions spaced apart from each other in the lengthwise direction, and a plurality of first upper connecting portions spaced apart from each other in the lengthwise direction;
 a second display cabinet defining a second length in the lengthwise direction and smaller than the first length, said second display cabinet including a plurality of second lower connecting portions spaced apart from each other in the lengthwise direction, and a plurality of second upper connecting portions spaced apart from each other in the lengthwise direction, each of said second lower connecting portions being aligned with and detachably engaged with a respective one of said first upper connecting portions in a height direction that is transverse to the lengthwise direction to bring said second display cabinet into stacking on a top of said first display cabinet in a selected one of upper stacking positions that are different from each other in the lengthwise direction so as to position said second display cabinet to said first display cabinet, each of said second upper connecting portions being aligned with and detachably engaged with a respective one of said first lower connecting portions in the height direction to bring said second display cabinet into stacking on a bottom of said first display cabinet in a selected one of lower stacking positions that are different from each other in the lengthwise direction so as to position said second display cabinet to said first display cabinet; and
 a third display cabinet defining a third length in the lengthwise direction and smaller than the second length, said third display cabinet including a plurality of third lower connecting portions spaced apart from each other in the lengthwise direction, and a plurality of third upper connecting portions spaced apart from each other in the lengthwise direction, each of said third lower connecting portions being aligned with and detachably engaged with a respective one of said first upper connecting portions in the height direction to bring said third display cabinet into stacking on a top of said first display cabinet in a selected one of upper attaching positions that are different from each other in the lengthwise direction so as to position said third display cabinet to said first display cabinet, each of said third upper connecting portions being aligned with and detachably engaged with a respective one of said first lower connecting portions in the height direction to bring said third display cabinet into stacking on a bottom of said first display cabinet in a selected one of lower attaching positions that are different from each other in the lengthwise direction so as to position said third display cabinet to said first display cabinet, each of said third lower connecting portions being aligned with and detachably engaged with a respective one of said second upper connecting portions in the height direction to bring said third display cabinet into stacking on a top of said second display cabinet in a selected one of upper supporting positions that are different from each other in the lengthwise direction so as to position said third display cabinet to said second display cabinet, each of said third upper connecting portions being aligned with and detachably engaged with a respective one of said second lower connecting portions in the height direction to bring said third display cabinet into stacking on a bottom of said second display cabinet in a selected one of lower supporting positions that are different from each other in the lengthwise direction so as to position said third display cabinet to said second display cabinet.

2. The multi-screen display installation device as claimed in claim 1, wherein said first display cabinet is stackable on a top of said second display cabinet to be placed in a selected one of upper placing positions that are different from each other in the lengthwise direction, and is positioned to said second display cabinet by alignment and engagement of at least one of said first lower connecting portions with a corresponding one of said second upper connecting portions in the height direction, said first display cabinet being further stackable on a bottom of said second display cabinet to be placed in a selected one of lower placing positions that are different from each other in the lengthwise direction, and being positioned to said second display cabinet by alignment and engagement of at least one of said first upper connecting portions with a corresponding one of said second lower connecting portions in the height direction.

3. The multi-screen display installation device as claimed in claim 1, wherein said first display cabinet has a first bottom wall extending in the lengthwise direction, and a first top wall extending in the lengthwise direction and opposite to said first bottom wall in the height direction, each of said first lower connecting portions being in form of a positioning hole formed in said first bottom wall and extending through said first bottom wall in the height direction, said first top wall having a plurality of first threaded holes which are spaced apart from each other in the lengthwise direction, each of said first upper connecting portions being in form of a threaded bolt which is threadedly engaged in a corresponding one of said first threaded holes and which extends in the height direction, said second display cabinet having a second bottom wall extending in the lengthwise direction and stackable on said first top wall, and a second top wall extending in the lengthwise direction and opposite to said second bottom wall in the height direction and stackable on said first bottom wall, each of said second lower connecting portions being in form of a positioning hole which is formed in said second bottom wall, extends through said second bottom wall in the height direction, and is engageable in a corresponding one of said first upper connecting portions, said second top wall having a plurality of second threaded holes which are spaced apart from each other in the lengthwise direction, each of said second upper connecting portions being in form of a threaded bolt which is threadedly engaged in a corresponding one of said second threaded holes, extends in the height direction, and is engageable in a corresponding one of said first lower connecting portions.

4. The multi-screen display installation device as claimed in claim 1, wherein said first display cabinet has a first bottom wall extending in the lengthwise direction, and a first top wall extending in the lengthwise direction and opposite to said first bottom wall in the height direction, said first bottom wall having two first lower splits spaced apart from each other in the lengthwise direction, said first top wall having two first upper splits spaced apart from each other in the lengthwise direction, said second display cabinet having a second bottom wall extending in the lengthwise direction and stackable on said first top wall, and a second top wall extending in the lengthwise direction and opposite to said second bottom wall in the height direction and stackable on said first bottom wall, said second bottom wall having two second lower splits spaced apart from each other in the lengthwise direction, said second top wall having two second upper splits spaced apart from each other in the lengthwise direction.

5. The multi-screen display installation device as claimed in claim 1, wherein the second length is 0.75 times the first length.

6. The multi-screen display installation device as claimed in claim 1, wherein said first display cabinet has a first bottom wall extending in the lengthwise direction, and a first top wall extending in the lengthwise direction and opposite to said first bottom wall in the height direction, each of said first lower connecting portions being in form of a positioning hole formed in said first bottom wall and extending through said first bottom wall in the height direction, said first top wall having a plurality of first threaded holes which are spaced apart from each other in the lengthwise direction, each of said first upper connecting portions being in form of a threaded bolt which is threadedly engaged in a corresponding one of said first threaded holes and which extends in the height direction, said second display cabinet having a second bottom wall extending in the lengthwise direction and stackable on said first top wall, and a second top wall extending in the lengthwise direction and opposite to said second bottom wall in the height direction and stackable on said first bottom wall, each of said second lower connecting portions being in form of a positioning hole which is formed in said second bottom wall, extends through said second bottom wall in the height direction, and is engageable in a corresponding one of said first upper connecting portions, said second top wall having a plurality of second threaded holes which are spaced apart from each other in the lengthwise direction, each of said second upper connecting portions being in form of a threaded bolt which is threadedly engaged in a corresponding one of said second threaded holes, extends in the height direction, and is engageable in a corresponding one of said first lower connecting portions, said third display cabinet having a third bottom wall extending in the lengthwise direction, and a third top wall extending in the lengthwise direction and opposite to said third bottom wall in the height direction, each of said third lower connecting portions being in form of a positioning hole which is formed in said third bottom wall, extends through said third bottom wall in the height direction, and is engageable in a selected one of said first upper connecting portions and said second upper connecting portions, said third top wall having a plurality of third threaded holes which are spaced apart from each other in the lengthwise direction, each of said third upper connecting portions being in form of a threaded bolt which is threadedly engaged in a corresponding one of said third threaded holes, extends in the height direction, and is engageable in a selected one of said first lower connecting portions and said second lower connecting portions.

7. The multi-screen display installation device as claimed in claim 1, wherein said third display cabinet has a third bottom wall extending in the lengthwise direction, and a third top wall extending in the lengthwise direction and opposite to said third bottom wall in the height direction, said third bottom wall having two third lower splits spaced apart from each other in the lengthwise direction, said third top wall having two third upper splits spaced apart from each other in the lengthwise direction.

8. The multi-screen display installation device as claimed in claim 1, wherein the first length is two times the third length, and the second length is 1.5 times the third length.

9. A multi-screen frame comprising: at least two structural units stacked on each other in a height direction, said structural units having at least one multi-screen display installation device of claim 1, said display cabinets of said structural units respectively defining lengths which are taken in a lengthwise direction that is transverse to the height direction and which are different from each other.

10. The multi-screen frame as claimed in claim 9, comprising a middle structural unit, a lower structural unit and an upper structural unit serving as said at least two structural units, said middle structural unit having a first display cabinet, said lower structural unit having two third display cabinets adjoined with each other in the lengthwise direction and stacked on a bottom of said first display cabinet, said upper structural unit having another two third display cabinets adjoined with each other in the lengthwise direction and stacked on a top of said first display cabinet, a length of said first display cabinet being two times a length of each of said third display cabinets.

11. The multi-screen frame as claimed in claim 9, comprising a middle structural unit, a lower structural unit and an upper structural unit serving as said at least two structural units, said middle structural unit having two second display cabinets adjoined with each other in the lengthwise direction, said lower structural unit having three third display cabinets adjoined with one another in the lengthwise direction and stacked on bottoms of said two second display cabinets, said upper structural unit having another three third display cabinets adjoined with one another in the lengthwise direction and stacked on tops of said two second display cabinets, a length of each of said second display cabinets being 1.5 times a length of each of said third display cabinets.

12. The multi-screen frame as claimed in claim 9, comprising a middle structural unit, a lower structural unit and an upper structural unit serving as said at least two structural units, said middle structural unit having two second display cabinets adjoined with each other in the lengthwise direction, said lower structural unit having a first display cabinet and a third display cabinet adjoined with each other in the lengthwise direction and stacked on bottoms of said two second display cabinets, said upper structural unit having another first display cabinet and another third display cabinet adjoined with each other in the lengthwise direction and stacked on tops of said two second display cabinets, a length of each of said second display cabinets being 1.5 times a length of each of said third display cabinets, a length of each of said first display cabinets being two times the length of each of said third display cabinets.

13. The multi-screen frame as claimed in claim 9, comprising a middle structural unit, a lower structural unit and an upper structural unit serving as said at least two structural units, said middle structural unit having two first display cabinets adjoined with each other in the lengthwise direction, said lower structural unit having two second display cabinets and a third display cabinet adjoined with one another in the lengthwise direction and stacked on bottoms of said two first display cabinets, said upper structural unit having another two second display cabinets and another third display cabinet adjoined with one another in the lengthwise direction and stacked on tops of said two first display cabinets, a length of each of said second display cabinets being 1.5 times a length of each of said third display cabinets, a length of each of said first display cabinets being two times the length of each of said third display cabinets.

14. The multi-screen frame as claimed in claim 9, comprising a middle structural unit, a lower structural unit and an upper structural unit serving as said at least two structural units, said middle structural unit having two first display cabinets adjoined with each other in the lengthwise direction, said lower structural unit having a second display cabinet, a third display cabinet and another second display cabinet adjoined with one another in the lengthwise direction and stacked on bottoms of said two first display cabinets, said upper structural unit having a second display cabinet, a third display cabinet and another second display cabinet adjoined with one another in the lengthwise direction and stacked on tops of said two first display cabinets, a length of each of said second display cabinets being 1.5 times a length of each of said third display cabinets, a length of each of said first display cabinets being two times the length of each of said third display cabinets.

15. An installation method comprising:
providing a plurality of multi-screen display installation devices of claim 1, each of said first display cabinets defining a first length in a lengthwise direction, each of said second display cabinets defining a second length in the lengthwise direction, the second length being smaller than the first length, each of said third display cabinets defining a third length in the lengthwise direction, the third length being smaller than the second length;
setting an installation size, the installation size having an installation height in a height direction that is transverse to the lengthwise direction, and an installation length in the lengthwise direction;
selecting at least two display cabinets from said first, second and third display cabinets with different lengths; and
adjoining said selected display cabinets with each other to form a multi-screen frame that meets the installation height and the installation length, said multi-screen frame having at least two structural units stacked on each other in the height direction, said at least two structural units being composed of said at least two display cabinets with different lengths, respectively.

16. The installation method as claimed in claim 15, wherein each of said first display cabinets is configured to be stackable on and positioned to a selected one of a top and a bottom of a corresponding one of said second display cabinets to be placed in a selected one of placing positions that are different from each other in the lengthwise direction, each of said first display cabinets being further configured to be stackable on and positioned to a selected one of a top and a bottom of a corresponding one of said third display cabinets to be placed in a selected one of connecting positions that are different from each other in the lengthwise direction, each of said second display cabinets being configured to be stackable on and positioned to a selected one of a top and a bottom of a corresponding one of said first display cabinets to be placed in a selected one of stacking positions that are different from each other in the lengthwise direction, each of said second display cabinets being further configured to be stackable on and positioned to a selected one of a top and a bottom of a corresponding one of said third display cabinets to be placed in a selected one of engaging positions that are different from each other in the lengthwise direction, each of said third display cabinets being configured to be stackable on and positioned to a selected one of a top and a bottom of a corresponding one of said first display cabinets to be placed in a selected one of attaching positions that are different from each other in the lengthwise direction, each of said third display cabinets being further configured to be stackable on and positioned to a selected one of a top and a bottom of a corresponding one of said second display cabinets to be placed in a selected one of supporting positions that are different from each other in the lengthwise direction.

\* \* \* \* \*